United States Patent
Vanmaele et al.

(10) Patent No.: US 7,297,460 B2
(45) Date of Patent: Nov. 20, 2007

(54) RADIATION CURABLE INK COMPOSITIONS SUITABLE FOR INK-JET PRINTING

(75) Inventors: Luc Vanmaele, Lochristi (BE); Johan Loccufier, Zwijaarde (BE); Roland Claes, Dendermonde (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 10/774,980

(22) Filed: Feb. 9, 2004

(65) Prior Publication Data

US 2004/0163570 A1 Aug. 26, 2004

Related U.S. Application Data

(60) Provisional application No. 60/455,606, filed on Mar. 17, 2003.

(30) Foreign Application Priority Data

Feb. 26, 2003 (EP) ................... 03100462

(51) Int. Cl.
*G03C 1/73* (2006.01)
*G03F 7/028* (2006.01)
*G03F 7/075* (2006.01)
*G03F 7/20* (2006.01)

(52) U.S. Cl. .............. 430/270.1; 430/285.1; 430/281.1; 430/280.1; 430/283.1; 430/286.1; 430/287.1; 430/288.1; 430/284.1; 430/942; 430/913; 430/914; 430/916

(58) Field of Classification Search ............ 430/270.1, 430/280.1, 281.1, 283.1, 285.1, 286.1, 284.1, 430/287.1, 916
See application file for complete search history.

(56) References Cited

U.S. PATENT DOCUMENTS

| 4,303,924 | A | 12/1981 | Young, Jr. ............ 346/1.1 |
|---|---|---|---|
| 4,680,368 | A | 7/1987 | Nakamoto et al. .......... 528/49 |
| 4,978,969 | A | 12/1990 | Chieng ................ 346/1.1 |
| 5,270,368 | A | 12/1993 | Lent et al. ............ 524/236 |
| 5,623,001 | A | 4/1997 | Figov .................. 522/84 |
| 5,641,346 | A | 6/1997 | Mantell et al. ........ 106/31.58 |
| 5,882,836 | A * | 3/1999 | Foster et al. ............ 430/194 |
| 6,110,987 | A | 8/2000 | Kamata et al. ............ 522/64 |
| 6,140,009 | A * | 10/2000 | Wolk et al. ............ 430/200 |
| 6,270,561 | B1 | 8/2001 | Nguyen .............. 106/31.85 |
| 6,310,115 | B1 | 10/2001 | Vanmaele et al. .......... 522/25 |
| 6,461,419 | B1 | 10/2002 | Wu et al. .............. 106/31.6 |
| 6,664,024 | B1 * | 12/2003 | Nguyen et al. .......... 430/280.1 |
| 2004/0162397 | A1 * | 8/2004 | Lee et al. ............ 525/420 |

FOREIGN PATENT DOCUMENTS

| EP | 0 071 345 | 2/1983 |
|---|---|---|
| EP | 0 465 039 | 1/1992 |
| EP | 0 540 203 | 5/1993 |
| EP | 0 658 607 | 6/1995 |
| EP | 1 302 499 | 4/2003 |
| WO | 97/31071 | 8/1997 |
| WO | 03/052014 | 6/2003 |

OTHER PUBLICATIONS

European Search Report, EP 03 10 0462, Jul. 23, 2003, Matthijssen.
Safety (MSDS) data for amide black 10B, undated.

* cited by examiner

*Primary Examiner*—Sin Lee
(74) *Attorney, Agent, or Firm*—Joseph T. Guy; Nexsen Pruet, LLC

(57) ABSTRACT

A radiation curable ink composition comprising at least one initiator and at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups; and a process for obtaining a colourless, monochrome or multicolour ink jet image comprising the steps of jetting one or more streams of ink droplets having the above-mentioned composition onto an ink-jet ink receiver material, and subjecting the obtained image to radiation curing.

45 Claims, No Drawings

RADIATION CURABLE INK COMPOSITIONS SUITABLE FOR INK-JET PRINTING

CROSS-REFERENCE TO RELATED PATENT APPLICATIONS

This application claims the benefit of U.S. Provisional Application No. 60/455,606 filed Mar. 17, 2003, which is incorporated by reference. In addition, this application claims the benefit of European Application No. 03100462.5 filed Feb. 26, 2003, which is also incorporated by reference.

FIELD OF THE INVENTION

The present invention relates to radiation curable ink compositions containing polyhedral oligomeric silsesquioxanes (POSS).

BACKGROUND OF THE INVENTION

Ink jet printing has become a technology of choice for short-run printing. A recent survey on progress and trends in ink jet printing technology is given by Hue P. Le in *Journal of Imaging Science and Technology* Vol. 42 (1), January/February 1998, which is herein incorporated by reference.

In ink jet printing tiny drops of ink fluid are projected directly onto an ink receptor surface without physical contact between the printing device and the receptor. The printing device stores the printing data electronically and includes a mechanism for ejecting the drops image-wise. Printing is accomplished by moving the print head across the paper or vice versa.

The jetting of the ink droplets can be performed in several different ways. In a first type of process a continuous droplet stream is created by applying a pressure wave pattern. This process is known as continuous ink jet printing. In a first embodiment the droplet stream is divided into droplets which are electrostatically charged, deflected and collected, and into droplets that remain uncharged are undeflected and form the image. Alternatively, the charged deflected stream forms the image and the uncharged undeflected jet is collected. In this variant of continuous ink jet printing several jets are deflected to a different degree and thus record the image (multideflection system).

According to a second process the ink droplets can be created "on demand" ("DOD" or "drop on demand" method) whereby the printing device ejects the droplets only when they are used in imaging on a receiver thereby avoiding the complexity of drop charging, deflection hardware, and ink collection. In drop-on-demand printing the ink droplet can be formed by means of a pressure wave created by a mechanical motion of a piezoelectric transducer (so-called "piezo method"), or by means of discrete thermal pulses (so-called "bubble jet" method, or "thermal jet" method).

Ink compositions for ink jet typically include the following ingredients: dyes or pigments, water and/or organic solvents, humectants such as glycols, detergents, thickeners, polymeric binders and preservatives. Ink compositions can be roughly divided into:

water-based inks, the drying mechanism involving absorption, penetration and evaporation;
oil-based inks, the drying involving absorption and penetration;
solvent-based inks, the drying primarily involving evaporation;
hot melt or phase change inks, in which the ink vehicle is liquid at the ejection temperature but solid at room temperature and in which drying is replaced by solidification;
UV-curable inks, in which drying is replaced by polymerization.

The first two types of ink compositions require a receiving medium that is more or less absorptive, whereas solvent based inks, hot melt inks or UV-curable inks are more suitable for non-absorbent substrates.

U.S. Pat. No. 4,303,924 is an important basic patent on ink compositions for ink jet, satisfying the need for a low solvent content, and containing a UV-curable compound. It discloses a jet drop printing process utilizing a radiation curable jet printing ink, comprising: ejecting at high speed from an orifice or orifices a radiation curable ink composition comprising a mixture of (a) 5-80% of a low molecular weight multifunctional ethylenically unsaturated material which will polymerize and cure upon irradiation, (b) 0-90% of a low molecular weight monofunctional ethylenically unsaturated material for viscosity control, cured film flexibility and bond strength, (c) 0-15% of a reactive synergist to promote curing efficiency, (d) 0.2-10% of a solvent dye colorant which does not interfere with the curing efficiency, (e) 0.5-15% of an oil soluble salt to impart conductivity, (f) 0.2-20% of a photoinitiator, and (g) 0-30% of an organic polar solvent compatible with said mixture, said radiation curable ink having a viscosity of less than about 15 centipoise, a resistivity of approximately 50-5000 ohm-cm, and a surface tension of approximately 20-70 dynes/cm so that the stream of said ink composition issuing from said orifice or orifices breaks into droplets, passing said stream of droplets through a charge ring to thereby differentially charge said droplets, selectively deflecting said differentially charged droplets and directing them toward a paper substrate positioned so as to receive a portion of said differentially charged droplets, depositing at least a portion of said droplets in a pattern on said paper substrate, and passing said substrate having said pattern deposited thereon under a radiation source for a sufficient period of time to cure said radiation curable jet printing ink whereby there is formed on said substrate a pattern which is light absorptive at infrared wavelengths, smear resistant and waterproof.

EP-A 0 071 345 discloses a jet ink composition for producing visible indicia of a substrate, the ink composition being formulated from a polymerizable epoxy resin, a colorant and a solvent, characterized in that the ink composition has at 25° C. a viscosity of 1.5 to 25 mPa.s, a resistivity of less than 4000 ohm-cm, and a velocity of sound between 800 and 2,500 meters per second, and the ink composition comprising (A) 10 to 70% by weight of an epoxy resin selected from (i) diglycidyl ethers of bisphenol A, said resin being predominantly the monomer thereof, (ii) polyepoxidized phenol or cresol novolacs, (iii) diepoxide ethers or esters having two epoxy cycloalkyl groups, (iv) polyglycidyl ethers of polyhydric alcohols, and (v) combinations thereof, the said epoxy resins being liquid at room temperature or having a Durran melting point of less than 100° C., and having an epoxy equivalent weight of less than 300; (B) 1 to 12% by weight of a photoinitiator, capable of rapidly polymerizing the epoxy resins which provides a Lewis acid effective to initiate said polymerization reaction upon exposure to a source of radiation such as ultra-violet light; (C) less than 2% by weight of a colorant that does not adversely affect cure of the epoxy resins; and (D) a solvent blend containing solvents selected from aliphatic alcohols having one to five carbon atoms, alkyl ketones having two to five carbon atoms, aromatic hydrocarbons of benzene, toluene and xylene, propylene carbonate, ethylene glycol ethers having three or four carbon atoms, alkyl acetates having two to four carbon atoms, and combinations of these solvents, the solvent blend being volatile at ambient conditions.

U.S. Pat. No. 4,680,368 discloses an ultraviolet curable ink composition comprising, as main components, (A) a polyurethane poly(meth)acrylate obtained by reacting a polyisocyanate compound of the formula:

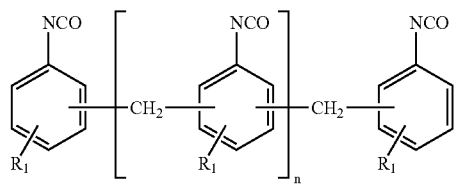

wherein $R_1$ is a hydrogen atom or a methyl group, and n is an integer of from 1 to 20, with a hydroxyl group-containing (meth)acrylate, and having, in one molecule, at least two (meth)acryloyl groups and at least two urethane bonds, (B) a radical polymerizable low molecular weight compound, and (C) a photopolymerization initiator.

U.S. Pat. No. 4,978,969 discloses a method for printing comprising the steps of: providing printing means for delivering ink to a substrate, said printing means comprising a thermal ink jet printing apparatus; supplying said thermal ink jet printing apparatus with an ultra-violet curable ink composition comprising in combination about 12-80% by weight ultra-violet curable adhesive, about 3-10% by weight dye pigment, and about 10-40% by weight solvent; delivering said ink composition from said thermal ink jet printing apparatus to said substrate; and applying ultra-violet light to said substrate with said ink composition thereon in an amount sufficient to form a permanent image on said substrate from said ink composition.

EP-A 0 465 039 discloses an optionally UV-A light-curable ink-jet ink comprising a colourant, a polar conductive component and as a major component of the liquid phase, one or more polymerizable monomers in which the conductive component is soluble.

EP-A 0 540 203 discloses an optionally UV-A light-curable non-conductive ink comprising a colourant and as a major component of the liquid phase, one or more polymerizable monomers.

U.S. Pat. No. 5,270,368 discloses an ink composition for use in ink jet printing comprising: a) a resin composition comprising at least two acrylate resin components, a first acrylate resin component being an aromatic acrylate resin that contains at least one pendant carboxyl group and a second resin acrylate component being an acrylated epoxy monomer or dimer; b) a photoinitiator; and c) an-organic carrier.

EP-A 0 658 607 discloses an ink comprising a pigment, a water-soluble resin, a water-soluble monomer to be set by application of energy and a photopolymerization initiator in an aqueous liquid medium.

U.S. Pat. No. 5,623,001 discloses an ultraviolet radiation curable ink-jet ink composition comprising in combination: a) water, said water content being between about 20% and 75% by weight; b) a water miscible ultra-violet curable polymerizable material; c) a photoinitiator; and d) a colorant, wherein the viscosity of said ink-jet ink composition is between about 2-40 centipoise.

U.S. Pat. No. 5,641,346 discloses a ink-jet ink comprising a colorant and a liquid component comprising water and at least one compound selected from the group consisting of epoxies and vinyl ethers.

WO 97/31071 discloses a radiation-curable ink jet composition comprising from 80% to 95% of a polyfunctional alkoxylated and/or polyfunctional polyalkoxylated acrylate monomer material; and a photoinitiator.

U.S. Pat. No. 6,110,987 discloses a photocurable composition comprising (A) 100 parts by weight of a compound with an ethylenically unsaturated bond, (B) 0.001-5 parts by weight of a cationic dye with absorptions in the visible light region of 400-740 nm, represented by general formula (1): $D^+ \cdot A_1^-$ (1) wherein $D^+$ is a cationic dye with absorptions in the visible light region of 400-740 nm and $A_1^-$ is an anion, (C) 0.005-10 parts by weight of a quaternary boron salt sensitizer represented by general formula (2):

wherein $R_1$, $R_2$, $R_3$ and $R_4$ each independently represent an alkyl group which may have a substituent, an aryl group which may have a substituent, an allyl group which may have a substituent, an aralkyl group which may have a substituent, an alkenyl group which may have a substituent, an alkynyl group which may have a substituent, a silyl group which may have a substituent, a heterocyclic group or a halogen atom, and $Z^+$ represents a quaternary ammonium cation, quaternary pyridinium cation, quaternary quinolinium cation, phosphonium cation, sulfonium cation, oxosulfonium cation, iodonium cation or metal cation, and (D) 0.01-10 parts by weight of an ultraviolet radical polymerization initiator which generates radicals upon absorption of light of wavelength 200-400 nm, wherein the ultraviolet radical polymerization initiator is a compound represented by general formula (9):

wherein Ar represents an aryl group which may have a substituent, and X represents a phosphinoyl group with a substituent. U.S. Pat. No. 6,110,987 further discloses among other monomers which may be used in the photocurable composition: (meth)acrylic polyfunctional polyorganosilsesquioxanes.

EP-A 1 302 499 discloses an active energy beam-curable composition comprising: a photo-cationic polymerizable substance; a photo-cationic polymerization initiator; and an oxetane compound.

EP-A 1 302 499 specifically discloses oxetanyl silsesquioxane. U.S. Pat. No. 6,270,561 discloses a hot melt ink composition comprising in combination: (a) a polyhedral silsesquioxane compound present in a proportion of about 0.1 to 30 wt % based on the total weight of the hot melt ink composition; (b) an ink colorant; (c) a resin; (d) a tackifier; (e) a viscosity modifier.

U.S. Pat. No. 6,461,419 discloses a cure-on-demand curable ink composition comprising a shelf stable homogeneous mixture of: at least one of: (a) a compound having 2 reactive silyl groups, and (b) a compound having at least 3 reactive silyl groups; acid generating catalyst comprising an onium salt; and pigment or pigment chip, whereby "curable" means that either reactive silyl groups hydrolyze in the presence of moisture to form compounds having silanol groups that react in the presence of an activated catalyst to form —Si—O—Si— linkages or silanol groups react in the presence of an activated catalyst to form —Si—O—Si— linkages. These moisture-curable compositions cure in the presence of moisture to form crosslinked materials, the moisture being obtained from the atmosphere, from the substrate, or it may be added to the composition.

WO 03/052014 discloses a structured hydrophilic surface with bumps and depressions, characterized in that the surface exhibits polyhedric oligomeric silicon-oxygen cluster units, which form, at least partially, the bumps. WO 03/052014 further discloses a structured hydrophilic surface characterized in that the polyhedric oligomeric silicon-oxygen cluster units are completely condensed silasesquioxanes represented by the formula $R_8Si_8O_{12}$ with structure I

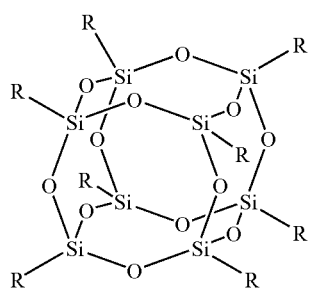

(I)

wherein the group R is the same or different and is hydrogen or a substituted or unsubstituted alkyl, cycloalkyl, alkenyl, cycloalkenyl, alkinyl, cycloalkinyl, aryl or heteroaryl group.

Summarizing, a radiation curable ink composition may in general contain one or more radiation curable prepolymers, or oligomers, radiation curable monomers or reactive diluents, optionally one or more photoinitiators, colorants, and other additives. Although polymerizable monomers are in principle suited for achieving the low viscosity needed, in ink jet printing, without introducing a significant amount of water or other solvent, it is a problem to find monomers that are suitable for use both in free radically and cationically radiation curable inks.

ASPECTS OF THE INVENTION

It is an aspect of the present invention to provide novel radiation curable ink compositions.

It is another aspect of the present invention to provide novel radiation curable ink compositions that can be cured free radically and/or cationically.

It is a further aspect of the present invention to provide radiation curable inks for ink jet printing that can be cured free radically and/or cationically.

These and other aspects of the present invention will become apparent from the description hereinafter.

SUMMARY OF THE INVENTION

Surprisingly it has been found that radiation curable ink compositions comprising at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups can be cured free radically and/or cationically.

Aspects of the present invention are realised by a radiation curable ink composition comprising at least one initiator and at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups.

Aspects of the preseent invention are also realized by a process for obtaining a colorless, monochrome or multicolour ink jet image comprising the steps of jetting one or more streams of ink droplets having the above-mentioned composition onto an ink-jet ink receiver material, and subjecting the obtained image to radiation curing.

Further aspects and advantages of the invention will become apparent from the description hereinafter.

DETAILED DESCRIPTION OF THE INVENTION

Definitions

The term radiation means all forms of electromagnetic and high energy ionizing radiation including IR-light, visible light, UV-light, X-rays, gamma rays, beta rays and accelerated electrons.

The term derivatives as used in connection with a particular polymer refers to variants thereof substituted with alkyl, alkoxy, alkyloxyalkyl, carboxy, alkylsulfonato and carboxy ester groups.

The term heterocyclic as used in disclosing the present invention means cyclic structures consisting of at least four ring atoms at least one of which is not carbon and does not include epoxy groups.

The term photoinitiator includes both cleaving and non-cleaving photoinitiators. Cleaving photoinitiators are capable of generating free radicals independently once exposed to UV light. Non-cleaving photoinitiators require the presence of a hydrogen donor (tertiary amine often referred to as a synergist or co-initiator) to produce free radicals.

The term tackifier as used in disclosing the present invention means an additive to impart adhesive properties to an otherwise non-adhesive material. An examples of a widely used tackifier is Celloyn 21-E, a phthalate ester of technical hydroabietyl alcohol from Eastman.

The term aqueous medium means a medium containing water and water-miscible organic solvents containing between 50% by weight of water and 100% by weight of water.

The term solvent medium means a medium containing organic solvents and may also contain dissolved water in a concentration of less than 50% by weight.

The term colorant includes both dyes and pigments.

The term dye, according to the present invention, means a colouring agent having a solubility of 10 mg/L or more in the medium in which it is applied and under the ambient conditions pertaining.

The term pigment is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

Silsesquioxanes

Aspects of the present invention are realised by a radiation curable ink composition comprising at least one initiator and at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups.

The structures of silsesquioxanes have been reported as random structure, ladder structure, cage structures and partial cage structures and are discussed in more detail, as well as the synthesis and the properties of silsesquioxanes, by R. Baney et al. in *Chemical Review*, 1995, 95, 1409-1430 as well as in the references cited therein and by Guizhi Li et al. in *Journal of Inorganic and Organometallic Polymers*, Vol. 11 (3), September 2001, page 123-154 as well as in the references cited therein. Silsesquioxanes with specific cage structures have been designated as polyhedral oligomeric silsesquioxanes, POSS. Such cage structures are described in *Journal of Inorganic and Organometallic Polymers*, Vol. 11 (3), September 2001, page 124, Scheme 1 (structures c-f).

According to a first embodiment of the radiation curable ink composition, according to the present invention, the polyhedral oligomeric silsesquioxane comprises at least one R-group comprising a curable functional group.

According to a second embodiment of the radiation curable ink composition, according to the present invention, the polyhedral oligomeric silsesquioxane comprises at least one R-group comprising a curable functional group which is selected from the group consisting of epoxide, aziridine, acrylate, methacrylate, acrylamide, methacrylamide, olefinic and styryl groups.

According to a third embodiment of the radiation curable ink composition, according to the present invention, the silsesquioxane has a specific cage structure represented by formulae I to III or a partial cage structure represented by formula IV:

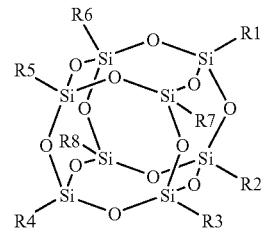

Cage Structure

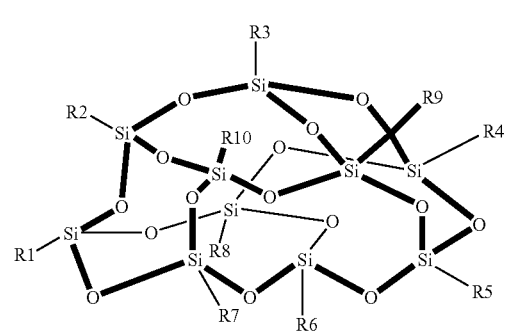

Cage Structure

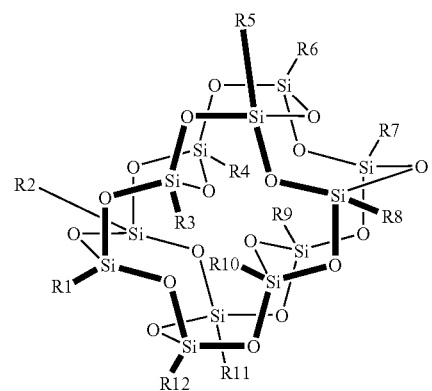

Cage Structure

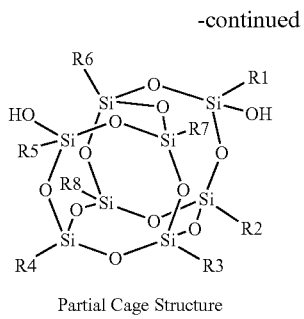

Partial Cage Structure wherein R1 to R12 represent hydrogen as well as inorganic or organic substituents and at least one of the R1-R12 groups comprises a curable functional group.

Polyhedral oligomeric silsesquioxanes (POSS) have two unique features: (1) the chemical composition ($RSiO_{1.5}$) is intermediate between that of silica ($SiO_2$) and silicones ($R_2SiO$). (2) POSS molecules are physically large, ranging from approximately 1 to 3 nm. This hybrid (organic/inorganic) composition of POSS technology enables it to occupy a unique and dramatically enhanced property space relative to traditional hydrocarbons and inorganics. An important benefit is that it affords the material formulations excellent thermal, mechanical and oxidative stability, as well as flammability resistance. This is largely due to the inorganic core of the POSS molecules. The organic portion of their composition provides improved compatibility with existing resins thereby enabling their facile incorporation into conventional plastics. POSS functionalized monomers according to the present invention possess a hybrid inorganic-organic three-dimensional structure which contains one to eight reactive organic functional groups.

The majority of POSS functionalized monomers contain seven non-reactive organic groups with one unique functionality. By varying the functional group and the seven non-reactive organic groups, a multitude of POSS functionalized monomers can be prepared to meet almost any need. While the monofunctional POSS monomers can be incorporated by copolymerization or grafting, multifunctional POSS monomers can be utilized as effective cross-linkers. POSS functionalized monomers react similarly in polymerization, grafting and cross-linking reactions to standard organic monomers. While they react like simple organic monomers, when incorporated into a polymeric material, POSS functionalized monomers impart significant improvements in the thermal, mechanical, and gas separation properties of traditional plastics.

Silsesquioxanes (POSS) according to the present invention are commercially available from companies such as Hybrid Plastics, Fountain Valley, Calif. 92708-6117, USA. Representative examples of compounds corresponding to general formulae I to IV are listed in the following Table 1 without being limited thereto. Compared to the state-of-the-art acrylates and methacrylates used in UV curable inks, the compounds according to the present invention have at least one extra functionality introduced into the molecule, offering new opportunities for ink formulation and for printing on non-absorbent substrates such as metal and ceramic surfaces.

TABLE 1

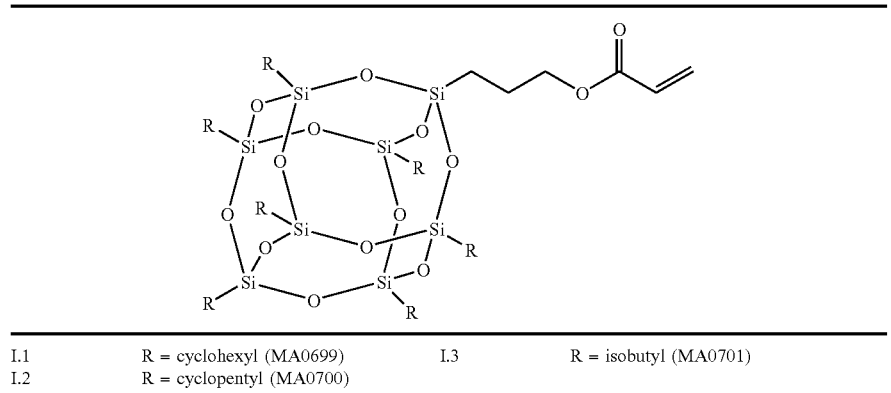

| I.1 | R = cyclohexyl (MA0699) | I.3 | R = isobutyl (MA0701) |
|---|---|---|---|
| I.2 | R = cyclopentyl (MA0700) | | |

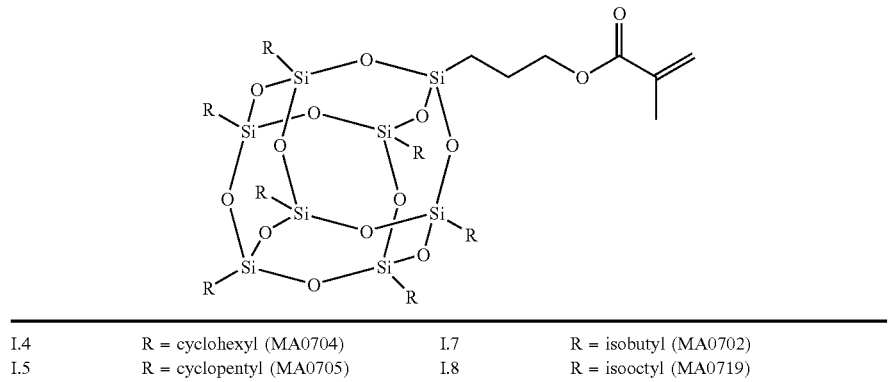

| I.4 | R = cyclohexyl (MA0704) | I.7 | R = isobutyl (MA0702) |
|---|---|---|---|
| I.5 | R = cyclopentyl (MA0705) | I.8 | R = isooctyl (MA0719) |

TABLE 1-continued
| I.6 | R = ethyl (MA0717) | I.9 | R = phenyl (MA0734) |
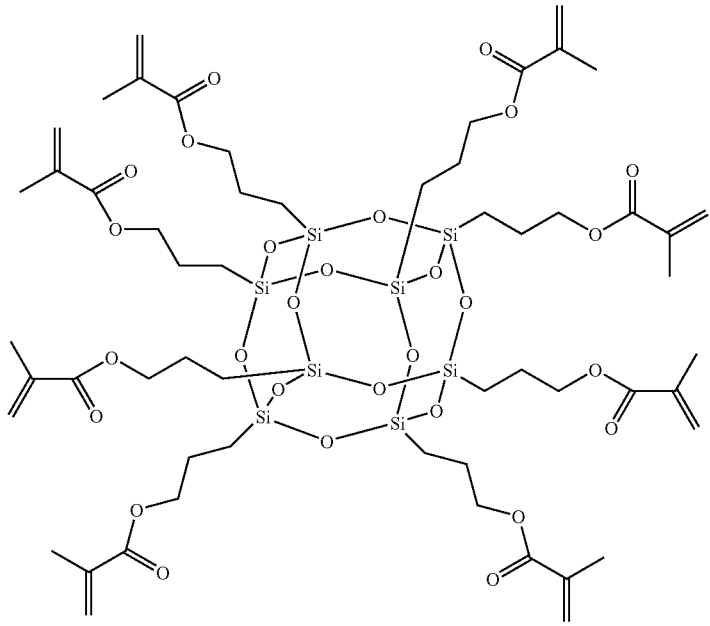
I.10 (MA0735)
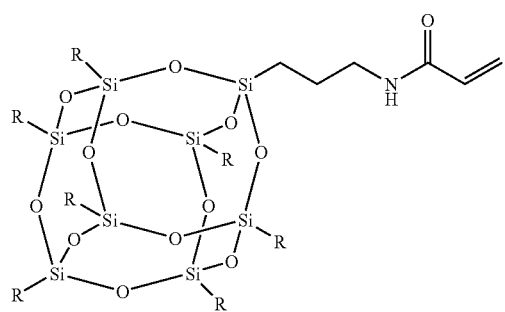
| I.11 | R = cyclohexyl | I.13 | R = isobutyl |
| I.12 | R = cyclopentyl | | |
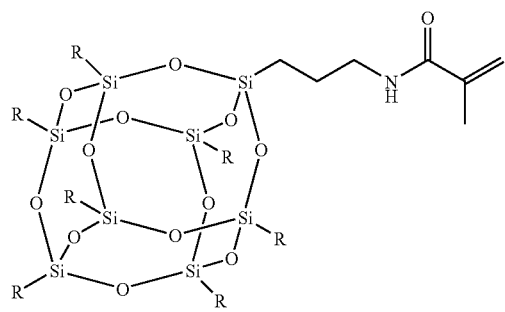
| I.14 | R = cyclohexyl | I.17 | R = isobutyl |
| I.15 | R = cyclopentyl | I.18 | R = isooctyl |
| I.16 | R = ethyl | I.19 | R = phenyl |

TABLE 1-continued

| | | | |
|---|---|---|---|
| I.20 | R = cyclohexyl (MA0715) | I.22 | R = isobutyl (MA0713) |
| I.21 | R = cyclopentyl (MA0711) | | |

| | | | |
|---|---|---|---|
| I.23 | R = cyclohexyl (MA0747) | I.24 | R = isobutyl (MA0750) |

| | | | |
|---|---|---|---|
| I.25 | R = cyclohexyl (MA0715) | I.27 | R = isobutyl (MA0713) |
| I.26 | R = cyclopentyl (MA0711) | | |

| | |
|---|---|
| I.28 | R = cyclopentyl (MA0720) |

TABLE 1-continued
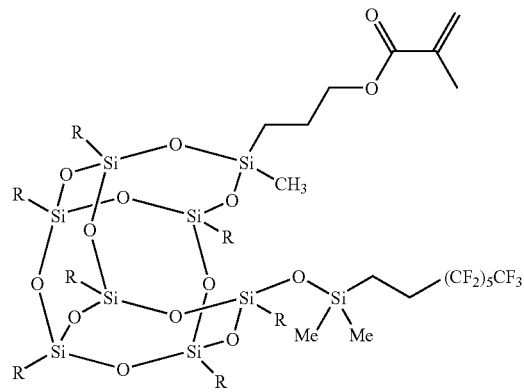
| I.29 | R = cyclopentyl (MA0730) |
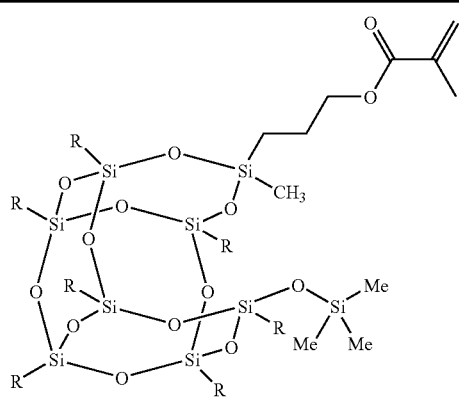
| I.30 | R = cyclopentyl (MA0740) | I.31 | R = isobutyl (MA0742) |
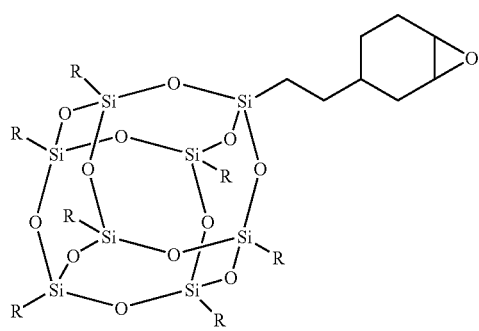
| I.32 | R = cyclohexyl (EP0399) | I.34 | R = isobutyl (EP0402) |
| I.33 | R = cyclopentyl (EP0400) | | |
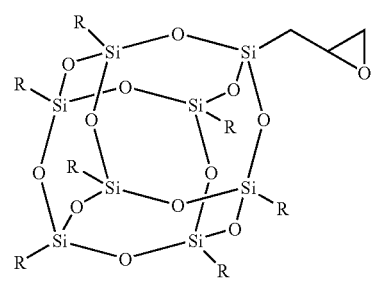
| I.35 | R = cyclohexyl | I.37 | R = isobutyl (EP0414) |
| I.36 | R = cyclopentyl (EP0410) | | |

TABLE 1-continued
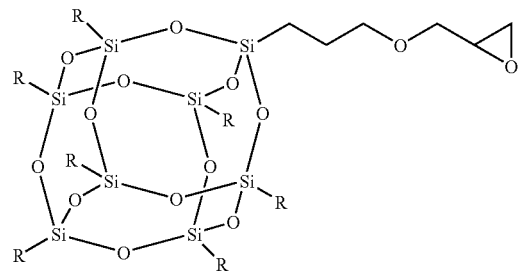
| | | | | |
|---|---|---|---|---|
| I.38 | R = cyolohexyl (EP0415) | I.41 | R = ethyl (EP0417) | |
| I.39 | R = cyclopentyl (EP0416) | I.42 | R = isooctyl (EP0419) | |
| I.40 | R = isobutyl (EP0418) | I.43 | R = phenyl (EP0425) | |
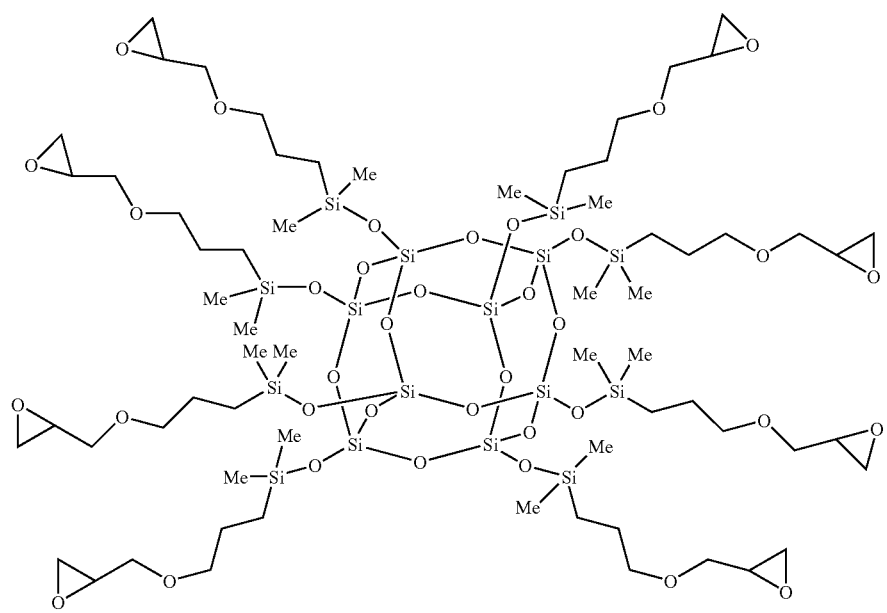
I.44 (EP0435)
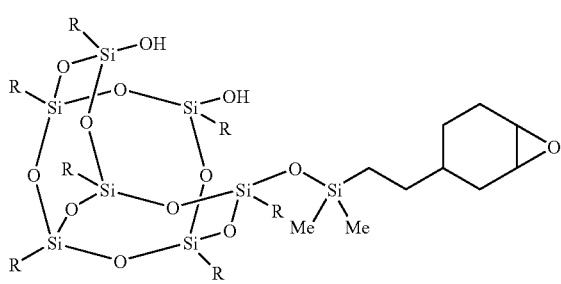
I.45    R = isobutyl (EP0407)

TABLE 1-continued
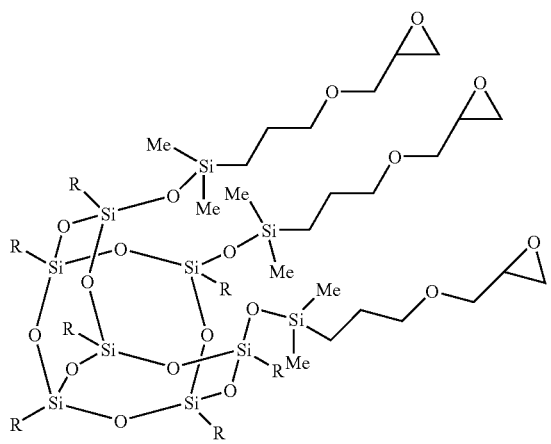
| I.46 | R = cyclohexyl (EP0421) | I.48 | R = isobutyl (EP0423) |
| I.47 | R = cyclopentyl (EP0420) | I.49 | R = ethyl (EP0422) |
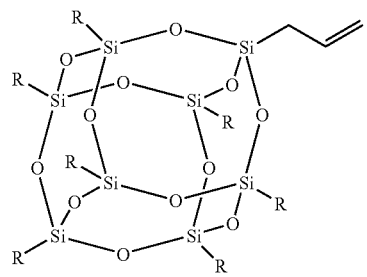
| I.50 | R = cyclohexyl (OL1099) | I.52 | R = isobutyl (OL1118) |
| I.51 | R = cyclopentyl (OL1100) | | |
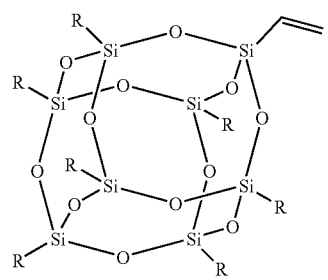
| I.53 | R = cyclohexyl (OL1122) | I.55 | R = isobutyl (OL1123) |
| I.54 | R = cyclopentyl (OL1120) | | |
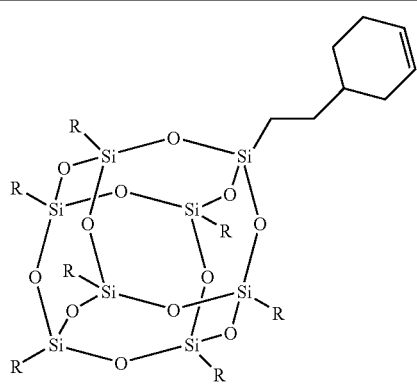
| I.56 | R = cyclopentyl (OL1110) |

TABLE 1-continued

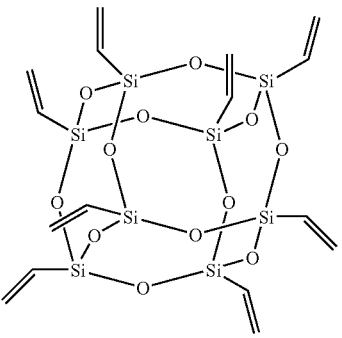

| I.57 | (OL1160) |
|------|----------|

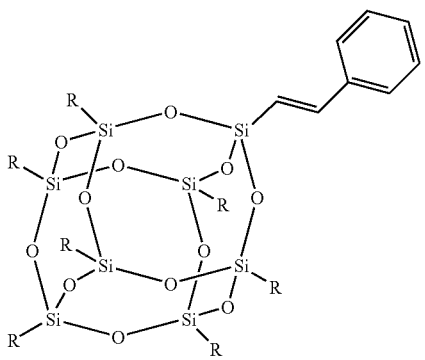

| I.58 | R = isobutyl (ST1506) |
|------|------------------------|

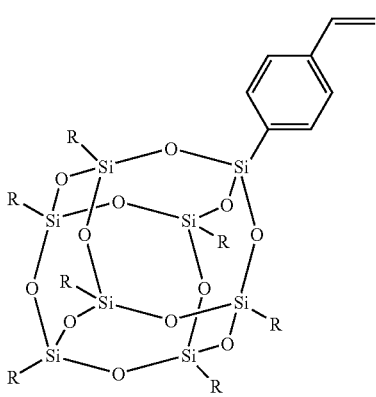

| I.59 | R = cyclohexyl (ST1509) | I.61 | R = isobutyl (ST1515) |
|------|--------------------------|------|------------------------|
| I.60 | R = cyclopentyl (ST1510) |      |                        |

A wide variety of monomers suitable for use in the radiation curable ink compositions, according to the present invention, can be prepared according to synthetic methods described in U.S. Pat. No. 6,100,417, U.S. Pat. No. 5,942,638, U.S. Pat. No. 5,939,576, U.S. Pat. No. 5,589,562, U.S. Pat. No. 5,484,867, and U.S. Pat. No. 5,412,053, in the above mentioned reviews published by R. Baney et al. in *Chemical Review*, 1995, 95, 1409-1430 and by Guizhi Li et al. in *Journal of Inorganic and Organometallic Polymers*, Vol. 11 (3), September 2001, page 123-154. Furthermore, many of the monomers are available from Hydrid Plastics Inc., Fountain Valley, Calif., USA (see codes given in brackets).

Initiators

According to a fourth embodiment of the radiation curable ink composition, according to the present invention, the initiator is a photoinitiator.

Photoinitiators can be divided in compounds that are suitable for cationic polymerization, compounds suitable for free radical polymerization and compounds which depending upon the conditions initiate free radical and/or cationic polymerization.

Information about suitable photoinitiators is to be found in: P. K. T. Oldring (ed.), "Chemistry and Technology of UV and EB Formulation for Coatings, Inks and Paints: Vol. 3 "Photoinitiators for Free Radical and Cationic Polymerization," SITA Technology Ltd., London, UK (1991); N. S. Allen,"Photoinitiators for UV and visible curing of coatings: mechanism and properties", *Journal of Photochemistry and Photobiology, A: Chemistry* 100 (1996) 101-107; J. V. Koleske, "A radiation-cure primer", *Journal of Coatings Technology*, Vol69, No. 866, March 1997, 29-38.

Disclosures specific on photoinitiators for cationic poymerisation include : J. V. Crivello, "The Chemistry of Photoacid Generating Compounds", Proceedings of the ACS Division of Polymeric Materials: *Science and Engineering*, Vol. 61, pages 62-66, (1989); J. V. Crivello and J. H. W. Lam, "Complex Triarylsulfonium Salt Photoinitiators I. The Identification, Characterization, and Synthesis of a New Class of Triarylsulfonium Salt Photoinitiators," *Journal of Polymer Science*, Polymer Chemistry Edition, Vol. 18, 2677-2695 (1980); J. V. Crivello and J. H. W. Lam, "Complex Triarylsulfonium Photoinitiators II. The Preparation of Several New Complex Triarylsulfonium salts and the Influence of Their Structure in Photoinitiated Cationic Polymerization," *Journal of Polymer Science*, Polymer Chemistry Edition, Vol. 18, pages 2697-2714 (1980); J. V. Crivello and J. H. W. Lam, "Diaryliodonium Salts A New Class of Photoinitiators for Cationic Polymerization," *Macromolecules*, Vol. 10, pages 1307-1315 (1977); and J. V. Crivello, J. L. Lee and D. A. Conlon, "Developments in the Design and Applications of Novel Thermal and Photochemical Initiators for Cationic Polymerization", *Makromol. Chem. Macromolecular Symposium*, Vol. 13/14, pages 134-160 (1988).

According to a fifth embodiment of the radiation curable ink composition, according to the present invention, the radiation curable ink further contains a photoinitiator selected from the group consisting of optionally alkyl and/or aryl substituted diaryl iodonium salts and their derivatives, optionally alkyl and/or aryl substituted triaryl sulfonium salts and their derivatives, and optionally alkyl and/or aryl substituted triphenyl phosphonium salts and their derivatives.

Further suitable photoinitiators for cationic polymerization are triarylsulphonium-tetrakis(pentafluorophenyl)-borate (RHODORSIL 2074 supplied by Rhône-Poulenc Chimie) described by C. Priou et al. in the Conference Proceedings of Radtech Europe '97, p. 314, and onium salts with specific light absorption characteristics as disclosed in WO 97/47660.

Suitable photoinitiators for free radical polymerization include LUCIRIN LR8953 (from BASF), IRGACURE 819 and 907 (from Ciba-Geigy), DAROCUR 4865 (from Ciba-Geigy), and isopropylthioxanthones, e.g. QUANTACURE ITX (from Rahn AG). Useful polymeric or oligomeric photoinitiators for free radical polymerization are copolymerizable photoinitiators such as discussed by M. Visconti et al. and W. Davies at al. in Conference papers 6 and 7 respectively, of the Radcure Coatings and Inks, Curing and Performance Conference (Harrogate, 22-23 June 1998). Examples of such photoinitiators are e.g. ESACURE KIP150, ESACURE KT 37 and KT 55 (from Lamberti), and acrylated IRGACURE 2959 or IRGACURE 2959 modified melamine acrylate (ex Ackros Chemicals).

Further suitable initiators are disclosed in following patents which are herein incorporated by reference: U.S. Pat. No. 4,683,317, U.S. Pat. No. 4,378,277, U.S. Pat. No. 4,279,717, U.S. Pat. No. 4,480,368, U.S. Pat. No. 4,443,495, U.S. Pat. No. 4,303,924, U.S. Pat. No. 4,751,102, U.S. Pat. No. 4,334,970, U.S. Pat. No. 5,270,368, U.S. Pat. No. 5,395,724, EP-A 0 540 203, EP-A 0 568 607 and EP-A 0 659 039.

According to a sixth embodiment of the radiation curable ink composition, according to the present invention, the initiator is a photoinitiator and the radiation curable ink further contains a co-initiator, also called initiator synergist. The initiator synergist is preferably of the amine type, e.g. the aminobenzoate type.

According to a seventh embodiment of the radiation curable ink composition, according to the present invention, the radiation curable ink further contains an aminobenzoate-type co-initiators with a primary photoinitiator selected from the group consisting of benzophenone and xanthone/thioxanthone compounds. More examples can be found in the Oldring reference cited above. Apart from curing with UV-light, visible light curing systems can also be used, using for example the camphoroquinone dimethylaminoethylmethacrylate (DMAEMA) system.

According to an eighth embodiment of the radiation curable ink composition, according to the present invention, the radiation curable ink further contains a photoinitiator in an amount from 0.2 to 20% by weight of the ink and preferably between 1 and 10% by weight of the ink composition.

According to a ninth embodiment of the radiation curable ink composition, according to the present invention, the radiation curable ink further contains a co-initiator in an amount from 0.2 to 20% by weight of the ink and preferably between 1 and 10% by weight of the ink composition.

Colorants

According to a tenth embodiment of the radiation curable ink composition, according to the present invention, the radiation curable ink further contains at least one colorant. Any colorant may be used to impart the desired colour to the ink.

According to an eleventh embodiment of the radiation curable ink composition, according to the present invention, the radiation curable ink further contains at least one dye.

According to a twelfth embodiment of the radiation curable ink composition, according to the present invention, the radiation curable ink further contains at least one pigment.

According to a thirteenth embodiment of the radiation curable ink composition, according to the present invention, the radiation curable ink further contains at least one inorganic pigment.

According to a fourteenth embodiment of the radiation curable ink composition, according to the present invention, the radiation curable ink further contains at least one colorant and the colorant is a dispersed pigment or a solid solution of a pigment.

According to a fifteenth embodiment of the radiation curable ink composition, according to the present invention, the radiation curable ink further contains a combination of at least one pigment and at least one dye.

A wide variety of organic and inorganic dyes and pigments, alone or in combination may be selected for use in the ink compositions of this invention. The pigment particles should be sufficiently small to permit free flow of the ink through the ink jet printing device, especially at the ejecting nozzles that usually have a diameter ranging from 10 μm to 50 μm. The pigment particle size also has an influence on the pigment dispersion stability, which is critical throughout the life of the ink. It is also desirable to use small particles for maximum colour strength.

According to a sixteenth embodiment of the radiation curable ink composition, according to the present invention, the radiation curable ink further contains at least one pigment having an average particle diameter of 5 nm to 15 μm, preferably, from 5 nm to 5 μm, more preferably from 5 nm to 1 μm, and particularly preferably from 5 nm to 300 nm. Pigment particle sizes outside these ranges may, of course, be used as long as the objectives of the present invention are achieved.

Very fine dispersions of pigments and methods for their preparation are disclosed in e.g. EP 0 776 952, U.S. Pat. No. 5,538,548, U.S. Pat. No. 5,443,628, EP 0 259 130, U.S. Pat. No. 5,285,064, EP 0 429 828, and EP 0 526 198, herein incorporated by reference.

The pigment can be black, cyan, magenta, yellow, red, blue, green, brown, mixtures thereof, and the like. Suitable carbon black pigment include Regal 400R, Mogul L, Elftex 320 from Cabot Co., or Carbon Black FW18, Special Black 250, Special Black 350, Special Black 550, Printex 25, Printex 35, Printex 55, Printex 150T from Degussa Co., and Pigmient Black 7. Suitable non-carbon black pigments include C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Black 7, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C.I. Pigment Blue 15:3, C.I. Pigment Blue 15:4, C. I. Pigment Red 23, C. I. Pigment Red 112, C. I. Pigment Yellow 126, C. I. Pigment Red 169, C. I. Pigment Orange 13, C. I. Pigment Red 1-10, 12, C.I. Pigment Blue 1:X, C.I. Pigment Yellow 42, C.I. Pigment Red 101, C.I. Pigment Brown 6, C. I. Pigment Brown 7, C. I. Pigment Brown 7:X, C. I. Pigment Black 11, C. I. Pigment Metal 1, C. I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C. I. Pigment Yellow 185, C.I. Pigment Yellow 180, C.I. Pigment Red 122, C.I. Pigment Red 184, bridged aluminum phtalocyanine pigments and solid solutions of pigments.

Suitable pigments are also those disclosed in *Industrial Organic Pigments, Production, Properties, Applications*, second edition, W. Herbst, K. Hunger ; VCH, 1997. Additional examples of suitable pigments are disclosed in U.S. Pat. No. 5,389,133.

According to a seventeenth embodiment of the radiation curable ink composition, according to the present invention, the radiation curable ink further contains at least one pigment selected from the group consisting of Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16; and carbon black.

The pigment may or may not be used in the form of a dispersion comprising a dispersant also called a pigment stabilizer. Suitable dispersants include dispersants of the polyester, polyurethane or polyacrylate type, especially in the form of high molecular weight block copolymer, and would typically be incorporated at a concentration of 2.5% to 100% by weight of the pigment. Suitable dispersants include DISPERBYK types (from BYK Chemie) and SOLSPERSE types (from Zeneca). A detailed list of suitable non-polymeric as well as some polymeric dispersants is to be found in McCutcheon's Functional Materials, North American Edition, Manufacturing Confectioner Publishing Co., Glen Rock, N.J., pp. 110-129 (1990), herein incorporated by reference. Further suitable pigment stabilizers are disclosed in DE 19636382, U.S. Pat. No. 5,720,802, U.S. Pat. No. 5,713,993, PCT/GB95/02501, U.S. Pat. No. 5,085, 689 and GB 2303376.

According to an eighteenth embodiment of the radiation curable ink composition, according to the present invention, the radiation curable ink further contains 0.5 to 20 percent by weight of pigments is in the ink composition.

According to a ninettenth embodiment of the radiation curable ink composition, according to the present invention, the radiation curable ink further contains 0.5 to 20 percent by weight of dyes in the ink composition.

According to a twentieth embodiment of the radiation curable ink composition, according to the present invention, the radiation curable ink further contains 0.5 to 20 percent by weight of colorants in the ink composition.

Other Monomers, Oligomers or Reactive Diluents Usable in Combination With the Invention Monomers According to a twenty-first embodiment of the radiation curable ink composition, according to the present invention, the radiation curable ink further contains at least one photopolymerizable compound.

According to a twenty-second embodiment of the radiation curable ink composition, according to the present invention, the radiation curable ink further contains at least one photocrosslinkable compound.

A wide variety of photopolymerisable and photocrosslinkable compounds can be used in combination with the monomers of the present invention in the radiation curable ink composition, according to the present invention.

Suitable photopolymerizable compounds include the monomers disclosed in DE-A 4005231, DE-A 3516256, DE-A 3516257, DE-A 3632657, U.S. Pat. No. 4,629,676, U.S. Pat. No. 6,294,592, WO 97/31071 and U.S. Pat. No. 6,300,388, herein incorporated by reference.

According to a twenty-third embodiment of the radiation curable ink composition, according to the present invention, the radiation curable ink further contains at least one photopolymerizable compound selected from the group consisting of vinylether methacrylates and vinylether acrylates, such as disclosed in U.S. Pat. No. 6,310,115 herein incorporated by refernce. Representative examples of such compounds are given in Table 2.

TABLE 2

| Vinylether (meth) acrylates |
| --- |
| II.1 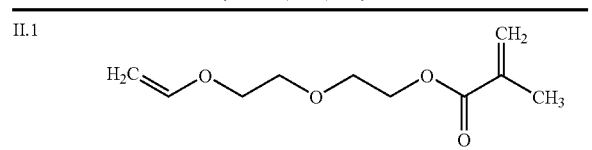 |

TABLE 2-continued

Vinylether (meth) acrylates

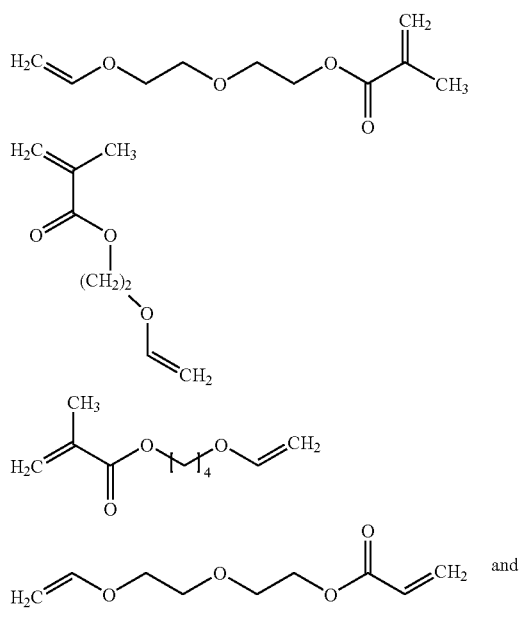

According to a twenty-fourth embodiment of the radiation curable ink composition, according to the present invention, the radiation curable ink further contains at least one photopolymerizable compound selected from the group consisting:

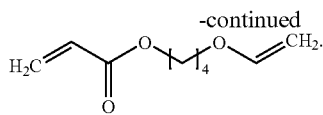

According to a twenty-fifth embodiment of the radiation curable ink composition, according to the present invention, the radiation curable ink further contains at least one polymer.

According to a twenty-sixth embodiment of the radiation curable ink composition, according to the present invention, the radiation curable ink further contains at least one prepolymer comprising one or more polymerizable functions.

According to a twenty-seventh embodiment of the radiation curable ink composition, according to the present invention, the radiation curable ink further contains at least one oligomer comprising one or more polymerizable functions.

According to a twenty-eighth embodiment of the radiation curable ink composition, according to the present invention, the radiation curable ink further contains at least one reactive diluent comprising one or more polymerizable functions.

According to a twenty-ninth embodiment of the radiation curable ink composition, according to the present invention, the radiation curable ink further contains a second photopolymerizable monomer, oligomer or prepolymer.

According to a thirtieth embodiment of the radiation curable ink composition, according to the present invention, the radiation curable ink further contains a second photopolymerizable monomer, which is selected from the group consisting of amino modified polyether acrylates, urethane acrylates, polyester acrylates, polyether acrylates, and epoxy acrylates.

Suitable prepolymers and reactive diluents for use in radiation curable compositions such as the ink composition of the present invention may be selected from the group consisting of unsaturated urethane(meth)acrylates, epoxy (meth)acrylates, polyolacrylates, polyether(meth)acrylates and polyester(meth)acrylates as described e.g. in "Chemistry & Technology of UV and EB formulation for coatings, inks and paints" Vol.2: Prepolymers and Reactive diluents for UV and EB curable formulations." Ed. G. WEBSTER—SITA Technology—London (1996) and in the periodical "Coating" 9/88, p. 348-353.

Other suitable prepolymers and oligomers belong to the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Pa. 19107 USA. (June 1986) p. 9. It will be clear that all these cited monomers, prepolymers, polymers and oligomers can be used in admixture.

A preferred second oligomer used in combination with a monomer of the present invention is an amino modified polyether acrylate known as CN 501 from Cray Valley Colo.

In a particular embodiment the second monomer, oligomer or prepolymer not belonging to the invention is the principal compound involved in the radiation curing, and the monomer according to the invention functions as so-called "reactive diluent" in order to reduce the viscosity of the final ink formulation.

Other Additives

According to a thirty-first embodiment of the radiation curable ink composition, according to the present invention, the radiation curable ink composition further contains water as a solvent.

According to a thirty-second embodiment of the radiation curable ink composition, according to the present invention, the radiation curable ink composition further contains water and/or at least one organic solvent.

Suitable organic solvents include alcohols, fluorinated solvents and dipolar aprotic solvents. Preferable solvents are methanol, ethanol, propanol, 1-butanol, 1-pentanol, 2-butanol, t.-butanol, glycol, glycolethers, N-methylpyrrolidone, N,N-dimethylacetamid, N, N-dimethylformamid, 2,4-pentanedione and hexafluoroacetone.

According to a thirty-third embodiment of the radiation curable ink composition, according to the present invention, the radiation curable ink composition is exclusive of a tackifier.

According to a thirty-fourth embodiment of the radiation curable ink composition, according to the present invention, the radiation curable ink further contains at least one conducting or semiconducting polymer.

According to a thirty-fifth embodiment of the radiation curable ink composition, according to the present invention, the radiation curable ink further contains at least one conducting or semiconducting polymer selected from the group consisting of substituted polyanilines, unsubstituted polyanilines, polypyrroles, substituted polythiophenes [such as poly(ethylenedioxythiophene) (PEDOT)], unsubstituted polythiophenes, substituted poly(phenylenevinylenes) [such as MEH-PPV], unsubstituted poly(phenylenevinylenes) [such as PPV], and polyfluorenes [such as PF6].

According to a thirty-sixth embodiment of the radiation curable ink composition, according to the present invention, the radiation curable ink further contains at least one antioxidant.

The radiation curable ink compositions, according to the present invention, may also include one or more additives such as biocides, buffering agents, anti-mould agents, pH adjustment agents, electric conductivity adjustment agents, chelating agents, anti-rusting agents, polymerisation inhibitors, light stabilizers, antioxidants and surfactants, photoinitiator stabilizers. Such additives may be included in the ink jet inks of the present invention in any effective amount, as desired.

Suitable pH controlling agents include, but are not limited to, acids, and bases, including hydroxides of alkali metals such as lithium hydroxide, sodium hydroxide and potassium hydroxide. The amount included will depend, of course, on the specific component being included.

Suitable photoinitiator stabilizers include those disclosed in EP 0 465 039. Preferred surfactants are of the non-ionic type, for example FLUORAD FC430 (from 3M Corp.). Such surfactants when present are preferably included in an amount of 0.1% to 10% by weight of the total ink composition.

Dendrimers

According to a thirty-seventh embodiment of the radiation curable ink composition, according to the present invention, the radiation curable ink further comprises a dendrimer.

Dendrimers are radially symmetrical molecules of a STARBURST™. topology comprised of an initiator core, such as nitrogen, ethyleneimine, and the like, interior layers attached to the core and comprised of a suitable number of arms, for instance, two to four arms, each arm being comprised of repeating units with the number of repeating units in each arm being considered the generation of the dendrimer, and terminal groups functionality, such as, for example, a primary amine attached to the outmost generation, which dendrimers are illustrated, for example, in U.S. Pat. Nos. 4,507,466, 4,631,337, 4,558,120, 4,568,737, and 4,587,329, and in Tomalia et al., Angewandte Chemie, Int. Ed. Engl. 29, 138 (1990). The size and shape of the STARBURST™ dendrimer molecule and the functional groups present in the dendrimer molecule can be controlled by the choice of the initiator core, the number of generations, and the choice of repeating units employed at each generation.

The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Thus, for example, ethylene diamine can be suitably reacted first with methyl acrylate to produce a compound such as N,N,N',N'-tetra (methoxycarbonylethyl)ethylene diamine. The aforesaid compound can be reacted in the next step with ethylene diamine to produce an amidoamine dendrimer having a generation number of zero, a molecular weight of 517, and four primary amino groups at the surface. Repetition of the above two-step procedure leads to subsequent generations.

An alternate synthetic route uses a convergent growth synthesis as described in detail in Hawker et al., J. Amer. Chem. Soc., 112, 7638 (1990).

The dendrimer may have other groups or segments, in addition to amino groups. For instance, the dendrimer may have a dye covalently attached to it, or it may have certain functional groups grafted onto it. Preferred dendrimers for use in the preparation of the ink composition of the present invention include the dendrimers disclosed in U.S. Pat. No. 6,312,679.

The dendrimers may be grafted with, for example, alkylene oxide oligomers or polymers, wherein the alkylene has 1-12 carbon atoms and the degree of polymerization of the alkylene oxide is in the range of from about 2 to about 100. The amount of grafting can be in any suitable range, preferably below 50% of the amino groups, and even more preferably below 10% of the amino groups. Grafting of ethylene oxide on the dendrimer can be performed by any suitable means known to those of ordinary skill in the art. For instance, a polyethylene glycol monomethyl ether of suitable molecular weight can be converted to polyethylene glycol monomethyl ether p-toluene sulfonate by suitably reacting with p-toluenesulfonyl chloride and pyridine, and the sulfonate then reacted with the dendrimer under suitable conditions, as known to those of ordinary skill in the art. Grafted dendrimers can also be obtained from Dendritech, Inc. in Midland, Mich.

Other preferred dendrimers for use in the preparation of the ink composition of the present invention include those having terminal amine functionality at the surface. It is further preferred that the dendrimer has a molecular weight in the range from about 300 to about 100,000, a generation number of from 0 to 10, a surface amine group concentration of from about 3 to about 4100, and a molecular diameter of from about 1 nm to about 1000 nm. More preferred dendrimers are those having terminal primary amine functionality. It is also more preferred that the dendrimer has a molecular weight in the range from about 500 to about 30,000, a generation number of from 0 to about 5, a surface group concentration of from about 4 to about 150, and a molecular diameter of from about 1 nm to about 150 nm. It is also preferred that the polydispersity index (Mw/Mn) of the dendrimer is low, preferably in the range of from about 1.1000 to about 1.0001, and more preferably in the range of from about 1.001 to about 1.0001. Examples of dendrimers prepared by the divergent approach include the STARBURST™ dendrimers available from Dendritech, Inc. These dendrimers from Dendritech, Inc. are polyamidoamines (PAMAMs) having primary amine terminal surface functionality, and made of ethylene diamine core and sequenced copolymers of ethylene diamine and methyl acrylate. They have a polydispersity index of 1.0007.

The dendrimer is present in the ink composition in an amount sufficient to provide sufficient adhesion of the ink components to the printing surface, and also to provide sufficient water resistance and cold and hot humidity resistance. The amount of the dendrimer is preferably in the range of from about 0.1% to about 10% by weight, more preferably in the range of from about 0.5% to about 2% by weight, and even more preferably in the range of from about 1% by weight to about 2% by weight, of the ink composition.

Physical Properties of the Radiation Curable Ink Compositions

In formulating the radiation curable ink compositions of the present invention, certain physical properties should be satisfied. For example, ink compositions for use in ink jet recording processes should have appropriate viscosity and surface tension characteristics.

According to a thirty-eighth embodiment of the radiation curable ink composition, according to the present invention, the radiation curable ink has a viscosity of from 1 to 100 mPa.s at 25° C.

According to a thirty-ninth embodiment of the radiation curable ink composition, according to the present invention, the radiation curable ink has a surface tension of from 20 to 72 mN/m and preferably of from 20 to 60 mN/m.

Process for Obtaining an Ink-Jet Image

Aspects of the present invention are realized by a process for obtaining a colourless, monochrome or multicolour ink jet image comprising the steps of jetting one or more streams of ink droplets having the above-mentioned composition onto an ink-jet ink receiver material, and subjecting the obtained image to radiation curing.

According to a first embodiment of the process for obtaining an ink-jet image, according to the present invention, the radiation curing is performed by means of at least one ultra-violet source and/or at least one electron beam source.

According to a second embodiment of the process for obtaining an ink-jet image, according to the present invention, wherein the curing is a free radical polymerization process.

According to a third embodiment of the process for obtaining an ink-jet image, according to the present invention, wherein the curing is a cationic polymerization process.

According to a fourth embodiment of the process for obtaining an ink-jet image, according to the present invention, the ink-jet ink receiver material is selected from the group consisting of paper, coated paper, polyolefin coated paper, cardboard, wood, composite boards, plastic, coated plastic, canvas, textile, metal, glasses, plant fibre products, leather, magnetic materials and ceramics, or supports provided with an ink-accepting layer.

According to a fifth embodiment of the process for obtaining an ink-jet image, according to the present invention, the ink-jet receiver material comprises an ink-accepting layer containing a microporous pigment or a polymer blend.

Radiation Curing Apparatuses

Apparatuses for radiation curing are known to those skilled in the art and are commercially available. For example, the curing proceeds with medium pressure mercury vapour lamps with or without electrodes, or pulsed xenon lamps. These ultraviolet sources usually are equipped with a cooling installation, an installation to remove the produced ozone and optionally a nitrogen inflow to exclude air from the surface of the product to be cured during radiation processing. An intensity of 40 to 240 W/cm in the 200-400 nm region is usually employed. An example of a commercially available ultraviolet medium-pressure electrodeless mercury vapour lamp is the model VPS/I600 curing system of Fusion UV systems Ltd., UK. A pulsed xenon flash lamp is commercially available from IST Strahlentechnik GmbH, Nurtingen, Germany. Using the Fusion model one has also the possibility to use metal halide doped Hg vapour or XeCl excimer lamps, each with its specific UV emission spectrum. This permits a higher degree of freedom in formulating the curing composition: a more efficient curing is possible using the lamp with the most appropriate spectral characteristics.

High energy ionizing radiation such as X-rays, gamma rays, beta rays and accelerated electrons can also be used to accomplish curing of the ink composition.

Ink-Jet Printing Heads

The radiation curable ink compositions according to the present invention can be used with any ink jet printhead, but are preferably used with piezoelectric printheads which can be heated to accommodate different viscosities. Typical examples include printheads form Spectra Inc., Epson, Brother, Xaar Ltd., Trident International, as well as printhead designs described in "Inkjet Technology and Product Development Strategies, S. F. Pond, Torrey Pines research, 2000" and in "Proceedings IS&T's International Conference on Digital Production Printing and Industrial Applications", 2001, Antwerp, Belgium, such as page 230-234. The radiation curable ink compositions can be used with any type of nozzle plate, such as nozzle plates based on silicon, polyimides, silicon nitride.

Industrial Applicability

The radiation curable ink compositions, according to the present invention, can be used in ink-jet printing and in other printing applications where radiation curing is applied, such as flexo printing and liquid electrophotography.

The radiation curable ink compositions, according to the present invention can also be used to manufacture printing plates, such as in computer-to-plate applications, and to make printed circuit boards (PCB) and displays, such as OLED's.

The present invention will now be illustrated by the following examples without however being limited thereto.

Ingredients used in the radiation curable ink compositions disclosed in the EXAMPLES:

TPGDA=tri(propyleneglycol) diacrylate
DPGDA=di(propyleneglycol) diacrylate
TMPTA=trihydroxymethylpropane triacrylate
CN501=CRAYNOR™ CN501, an amino-modified polether acrylate from Cray Valley Colo.

EXAMPLE 1

The solubility of some invention compounds was determined in several reactive diluents and oligomers such as TPGDA, TMPTA and CN501 and the results are given below in Table 3.

TABLE 3

|  | Solubility in TPGDA [wt %] | Solubility in TMPTA [wt %] | Solubility in CN501 [wt %] |
| --- | --- | --- | --- |
| I.6 | <10* | <10* | <10* |
| I.7 | <10* | <10* | <10* |
| I.9 | insoluble# | insoluble# |  |

TABLE 3-continued

|  | Solubility in TPGDA [wt %] | Solubility in TMPTA [wt %] | Solubility in CN501 [wt %] |
| --- | --- | --- | --- |
| I.10 | 50 | 50 | 50 |
| I.22 | 50 | 50 | 50 |
| I.24 | 50 | 50 | 50 |

*addition of a very small amount of $CH_2Cl_2$ resulted in complete solubility, the compound remaining in solution upon removal of the $CH_2Cl_2$
dissolved after the addition of a very small amount of $CH_2Cl_2$

EXAMPLE 2

The following clear inks were formulated:

TABLE 4

|  | DPGDA | Craynor CN501 |  |
| --- | --- | --- | --- |
|  |  |  | I.10 |
| ink 1 | 50 g | 45 g | 5 g |
| ink 2 | 50 g | 40 g | 10 g |
| ink 3 | 50 g | 25 g | 25 g |
|  |  |  | I.24 |
| ink 4 | 50 g | 45 g | 5 g |
| ink 5 | 50 g | 40 g | 10 g |
| ink 6 | 50 g | 25 g | 25 g |
|  |  |  | I.22 |
| ink 7 | 50 g | 45 g | 5 g |
| ink 8 | 50 g | 40 g | 10 g |
| ink 9 | 50 g | 25 g | 25 g |
|  |  |  | I.6 |
| ink 10 | 50 g | 47.5 g | 2.5 g |
| ink 11 | 50 g | 45 g | 5 g |
|  |  |  | I.7 |
| ink 12 | 50 g | 47.5 g | 2.5 g |
| ink 13 | 50 g | 45 g | 5 g |

10 g Irgacure 500 and 5 g NMDA were added to each ink formulation and the resulting ink compositions were coated on a clear unsubbed 175 μm thick PET polyester film, using a bar coater and a 10 μm wired bar.

The coated films were cured using a Fusion DRSE-120 conveyer, equipped with a Fusion VPS/I600 lamp (D bulb), which transported the films under the UW lamp on a conveyer belt at a speed of 20 m/min. The percentage of the maximum output of the lamp to cure the film was used as a measure for the sensitivity.

The curing was evaluated by means of a scratch test with a cotton bud. If, the coating did not remain visually unchanged after scratching, the curing was regarded as being incomplete. The sensitivities of the inks are summarised in Table 4.

TABLE 5

|  | Sensitivity output % |
| --- | --- |
| Ink 1 | 55 |
| Ink 2 | 65 |
| Ink 3 | 100 |
| Ink 4 | 60 |

TABLE 5-continued

| | Sensitivity output % |
|---|---|
| Ink 5 | 90 |
| Ink 6 | 100 |
| Ink 7 | 50 |
| Ink 8 | 60 |
| Ink 9 | 90 |
| Ink 10 | 50 |
| Ink 11 | 50 |
| Ink 12 | 50 |
| Ink 13 | 45 |

As can be seen from Table 4 all inks were readily cured.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A radiation curable ink composition comprising at least one initiator and at least one polyhedral oligomeric silsesquioxane (POSS) characterized in that said silsesquioxane is selected from the group consisting of:

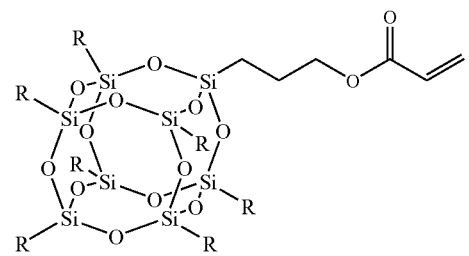

wherein R=cyclohexyl, cyclopentyl or isobutyl;

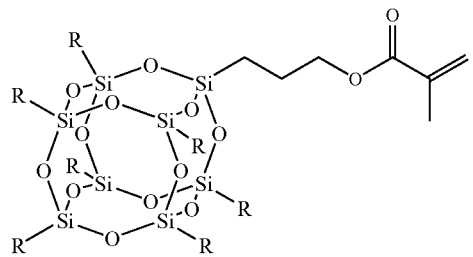

wherein R=cyclohexyl, cyclopentyl, ethyl, isobutyl, isooctyl or phenyl;

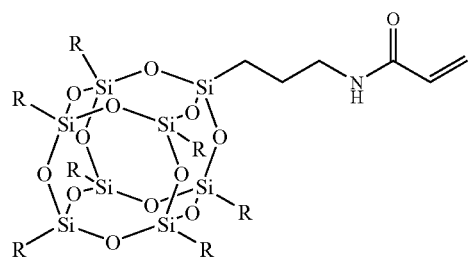

wherein R=cyclohexyl, cyclopentyl or isobutyl;

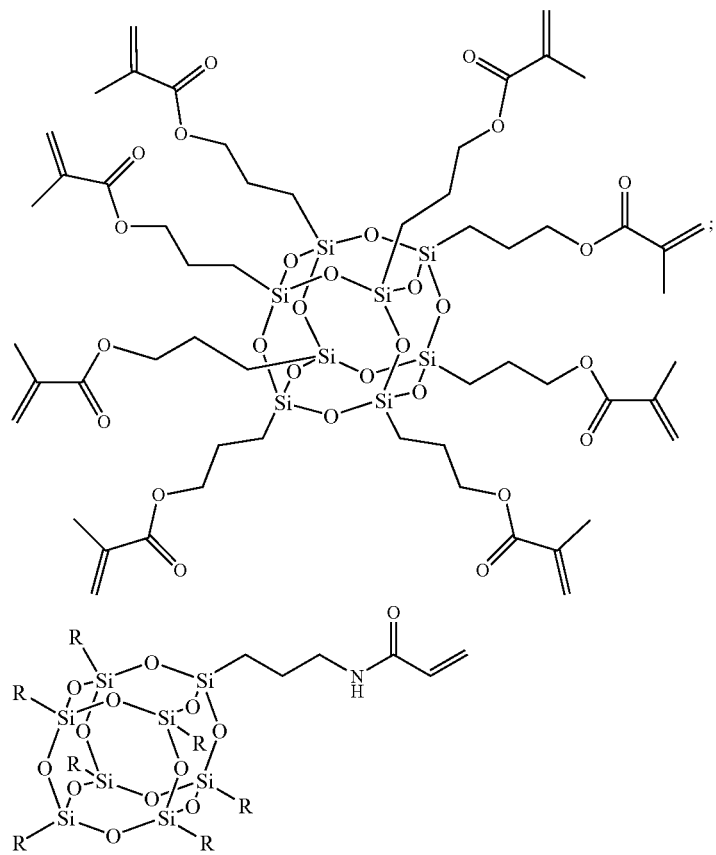
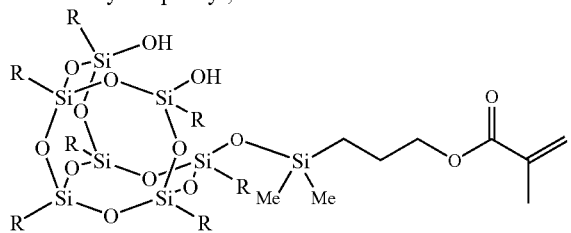
wherein R=cyclohexyl, cyclopentyl, ethyl, isobutyl, isooctyl or phenyl;
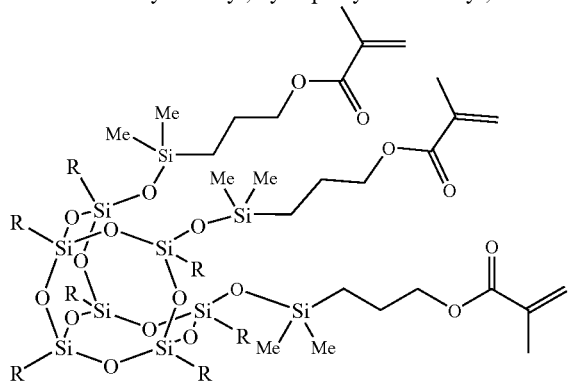
wherein R=cyclohexyl, cyclopentyl or isobutyl;
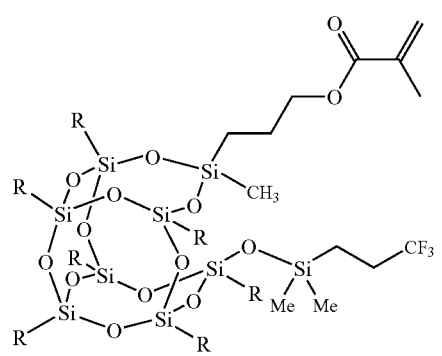
wherein R=cyclohexyl, cyclopentyl or isobutyl;
wherein R=cyclohexyl or isobutyl;
wherein R=cyclopentyl;

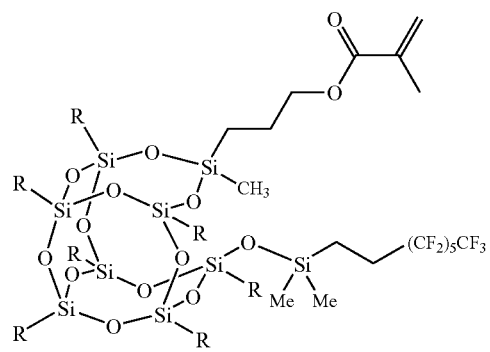
wherein R=cyclopentyl;
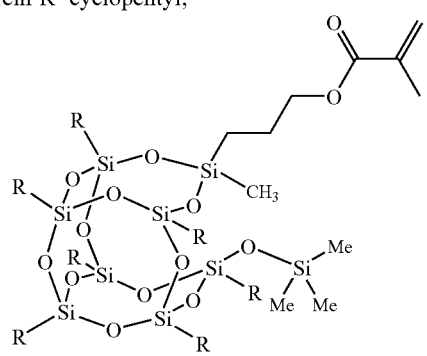
wherein R=cyclopentyl or isobutyl;
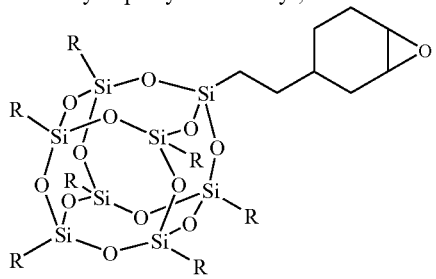
wherein R=cyclohexyl, cyclopentyl or isobutyl;
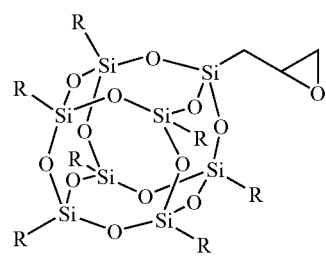
wherein R=cyclohexyl, cyclopentyl or isobutyl;
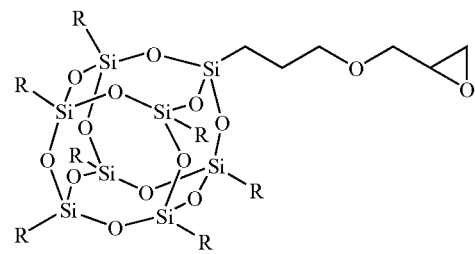
wherein R=cyclohexyl, cyclopentyl, ethyl, isobutyl, isooctyl or phenyl;
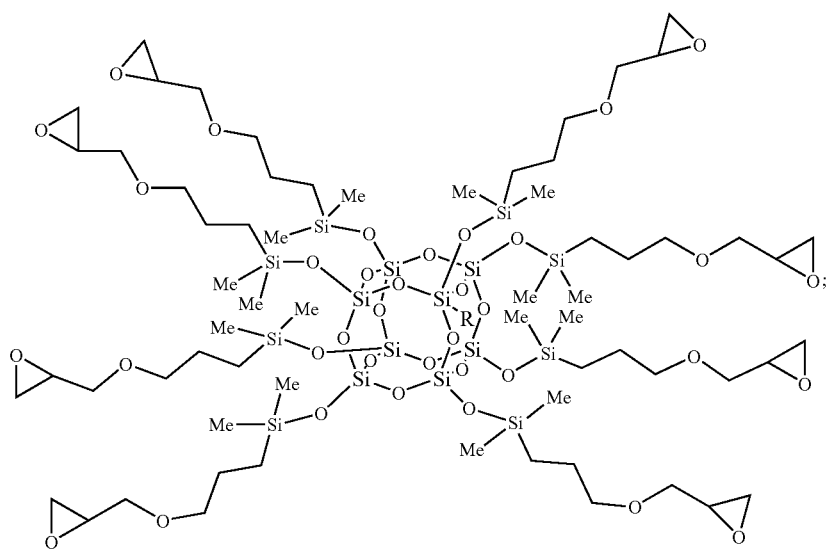

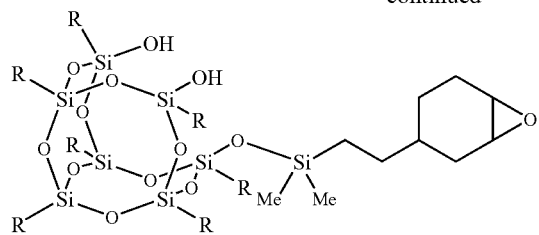
wherein R=isobutyl;
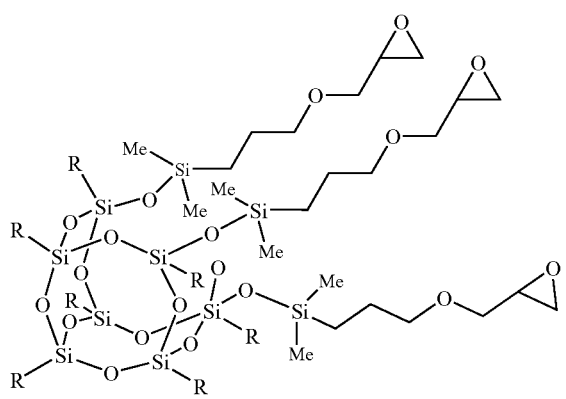
wherein R=cyclohexyl, cyclopentyl, ethyl, isobutyl;
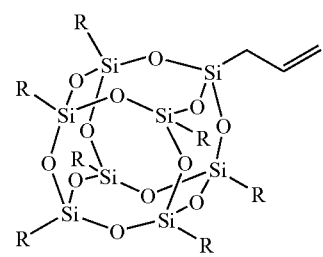
wherein R=cyclohexyl, cyclopentyl, isobutyl;
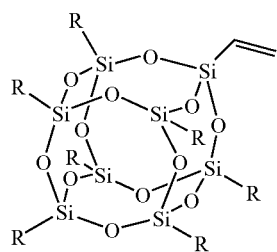
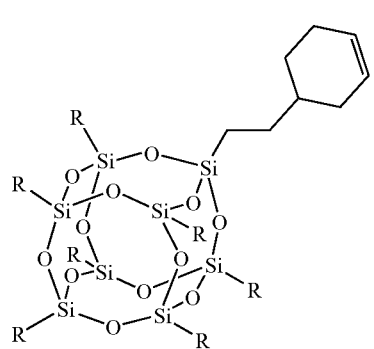
wherein R=cyclohexyl, cyclopentyl, isobutyl;
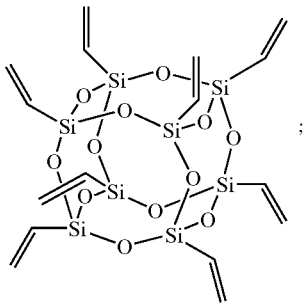
wherein R=cyclopentyl;
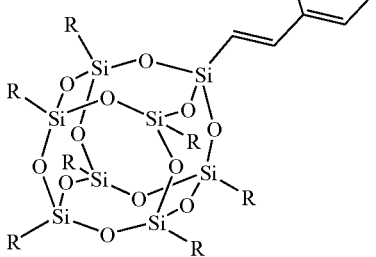
wherein R=isobutyl; and

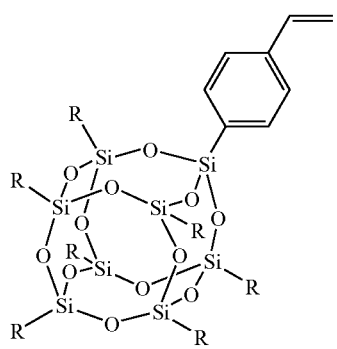

wherein R=cyclohexyl, cyclopentyl, isobutyl; and wherein said radiation curable ink composition contains at least one colorant in a concentration between 0.5 and 20 percent by weight based on the total weight of said radiation curable ink composition and each colorant is a pigment.

2. Radiation curable ink composition according to claim 1, wherein said initiator is a photoinitiator.

3. Radiation curable ink composition according to claim 1, wherein said composition further contains an initiator synergist.

4. Radiation curable ink composition according to claim 1, wherein said colorant is an inorganic pigment.

5. Radiation curable ink composition according to claim 1, wherein said colorant is a dispersed pigment or a solid solution of a pigment.

6. Radiation curable ink composition according to claim 1, wherein said pigment is selected from the group consisting of Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16, and carbon black.

7. Radiation curable ink composition according to claim 1, wherein said ink composition further contains a second photopolymerizable monomer, oligomer or prepolymer.

8. Radiation curable ink composition according to claim 7, wherein said second monomer is selected from the group consisting of amino modified polyether acrylates, urethane acrylates, polyester acrylates, polyether acrylates, and epoxy acrylates.

9. Radiation curable ink composition according to claim 1, wherein said composition further contains water and/or at least one organic solvent.

10. Radiation curable ink composition according to claim 1, wherein said composition further comprises at least one antioxidant.

11. A radiation curable ink composition according to claim 1 wherein said composition further comprises a dendrimer.

12. Radiation curable ink composition according to claim 1, wherein the viscosity of said ink composition is between 1 and 100 mPa.s at 25° C.

13. Radiation curable ink composition according to claim 1, wherein said radiation curable ink composition is a radiation curable ink-jet ink composition.

14. A radiation curable ink composition comprising at least one initiator and at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups wherein said radiation curable ink composition contains at least one colorant in a concentration between 0.5 and 20 percent by weight based on the total weight of said radiation curable ink composition wherein said composition further comprises at least one photopolymerizable compound selected from the group consisting of vinylether methacrylates and vinylether acrylates.

15. Radiation curable ink composition according to claim 14, wherein said vinylether methacrylate or vinylether acrylate is selected from group consisting of:

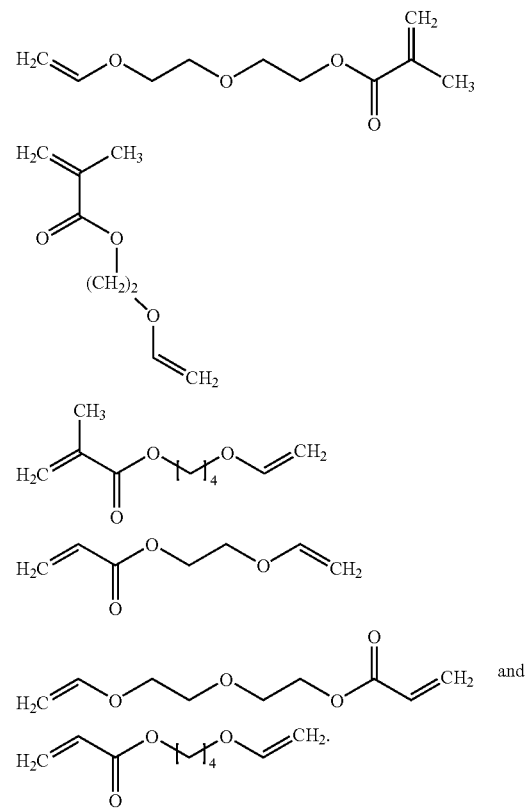

16. Radiation curable ink composition comprising at least one initiator and at least one polyhedral oligomeric silsesquioxane (POSS) characterized in that said silsesquioxane is selected from the group consisting of:

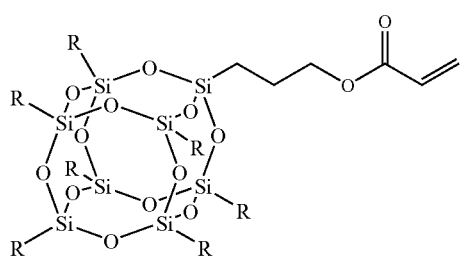

wherein R=cyclohexyl, cyclopentyl or isobutyl;

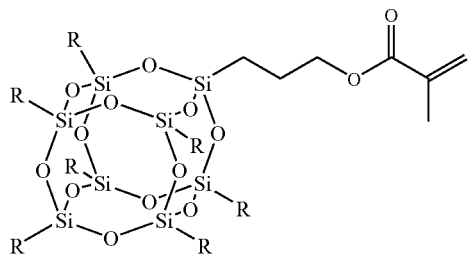
wherein R=cyclohexyl, cyclopentyl, ethyl, isobutyl, isooctyl or phenyl;
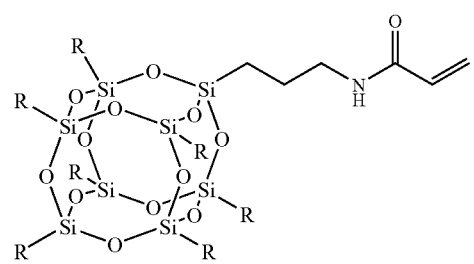
wherein R=cyclohexyl, cyclopentyl or isobutyl;
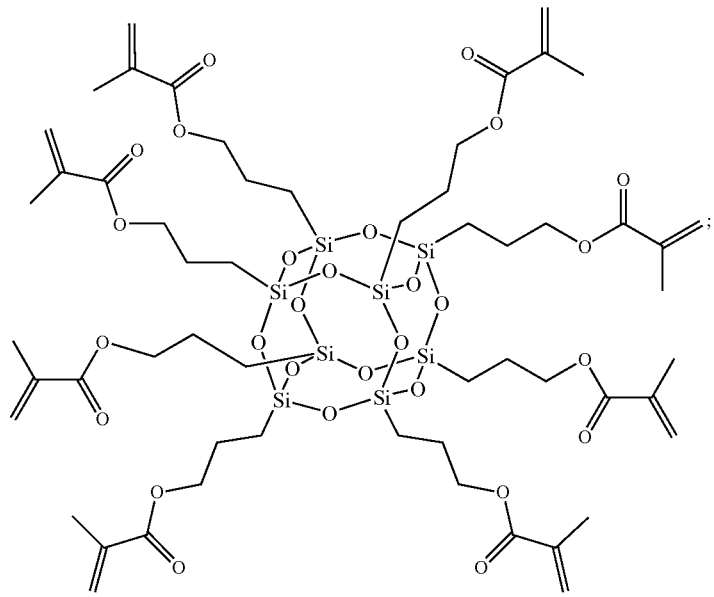
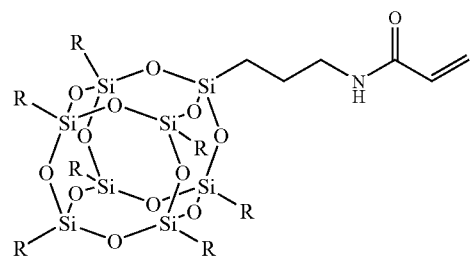
wherein R=cyclohexyl, cyclopentyl, ethyl, isobutyl, isooctyl or phenyl;

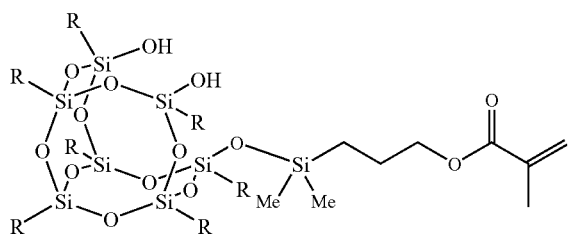
wherein R=cyclohexyl, cyclopentyl or isobutyl;
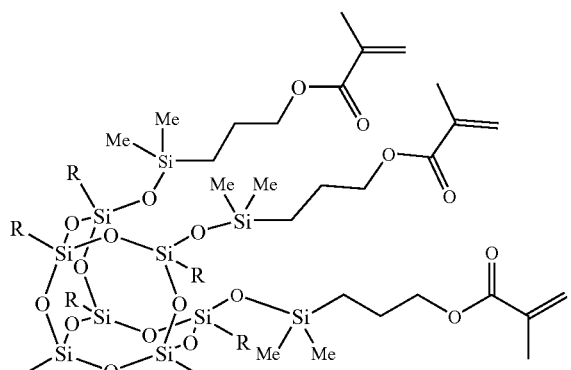
wherein R=cyclohexyl or isobutyl;
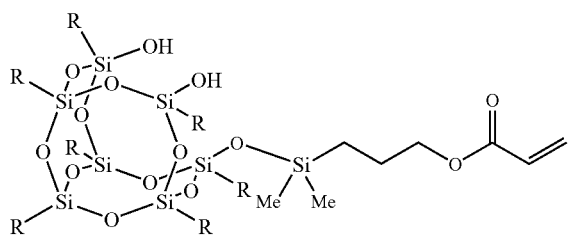
wherein R=cyclohexyl, cyclopentyl or isobutyl;
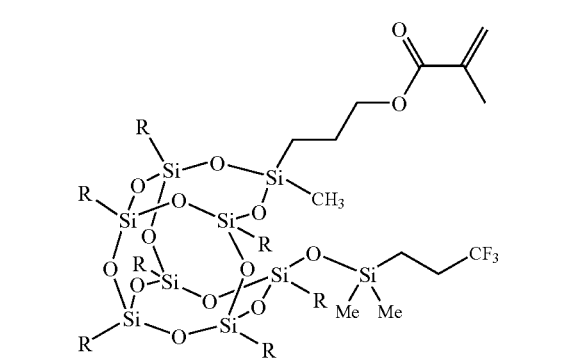
wherein R=cyclopentyl;
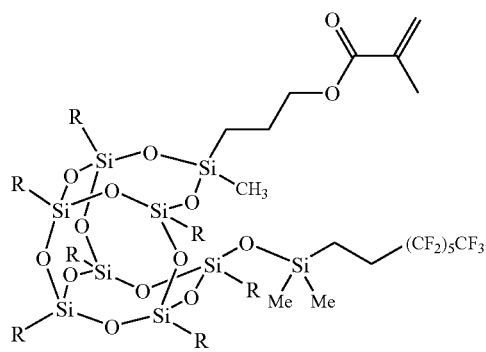
wherein R=cyclopentyl;
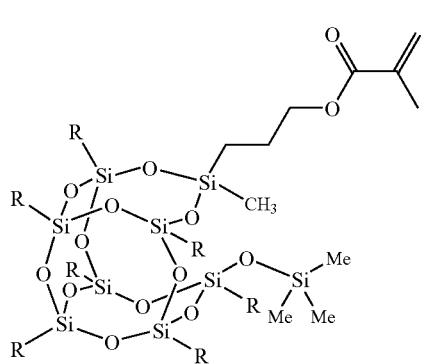
wherein R=cyclopentyl or isobutyl;
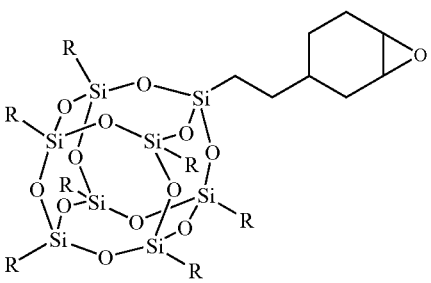
wherein R=cyclohexyl, cyclopentyl or isobutyl;
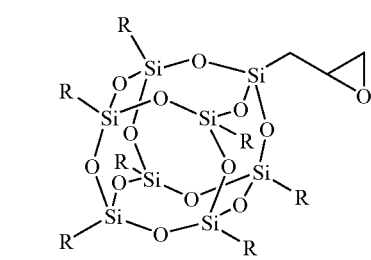
wherein R=cyclohexyl, cyclopentyl or isobutyl;

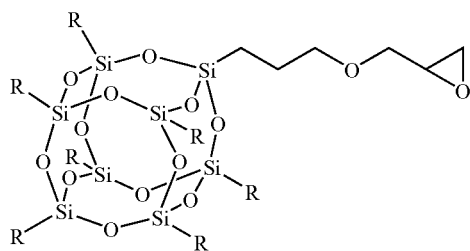
wherein R=cyclohexyl, cyclopentyl, ethyl, isobutyl, isooctyl or phenyl;
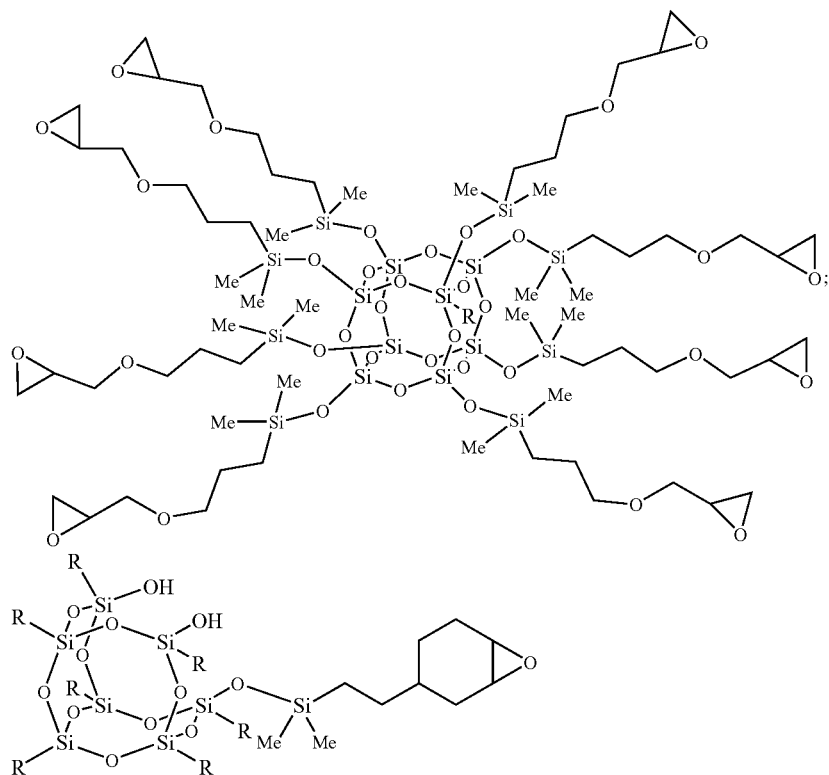
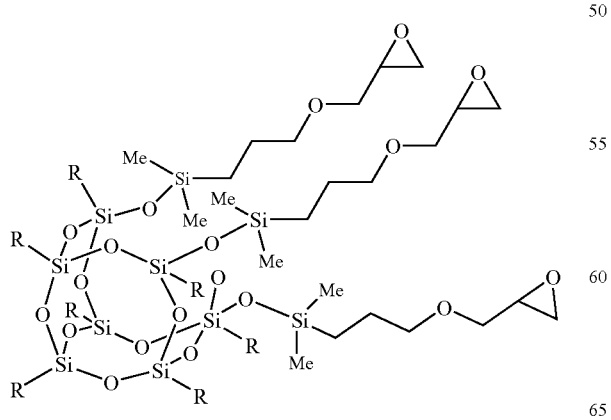
wherein R=isobutyl;
wherein R=cyclohexyl, cyclopentyl, ethyl, isobutyl;

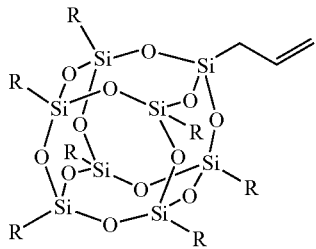

wherein R=cyclohexyl, cyclopentyl, isobutyl;

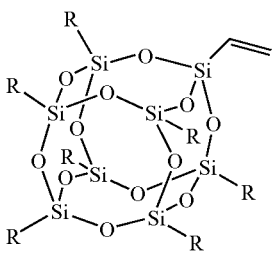

wherein R=cyclohexyl, cyclopentyl, isobutyl;

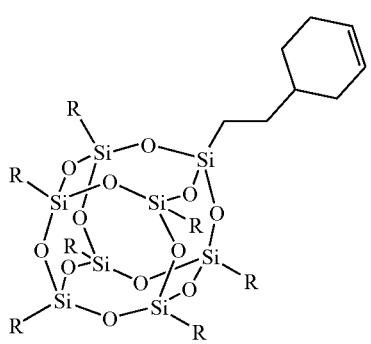

wherein R=cyclopentyl;

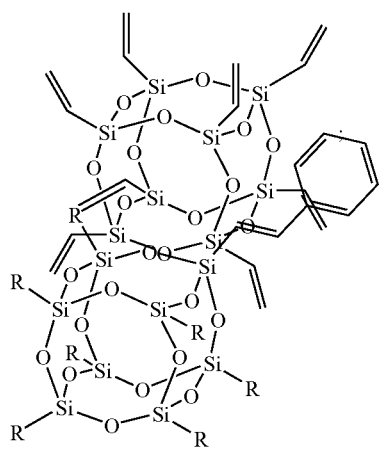

wherein R=isobutyl; and

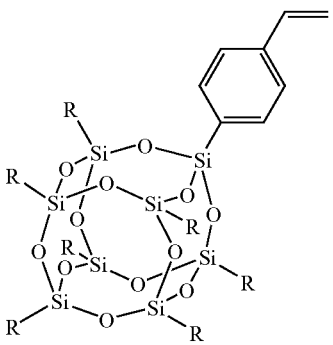

wherein R=cyclohexyl, cyclopentyl, isobutyl; and wherein said composition further comprises at least one conducting or semiconducting polymer.

17. Radiation curable ink composition according to claim 16, wherein said at least one conducting or semiconducting polymer is selected from the group consisting of substituted polyanilines, unsubstituted polyanilines, polypyrroles, substituted polythiophenes, unsubstituted polythiophenes, substituted poly(phenylenevinylenes, unsubstituted poly(phenylenevinylenes, and polyfluorenes.

18. A process for obtaining a colourless, monochrome or multicolour ink jet image comprising the steps of jetting one or more streams of ink droplets having a radiation curable ink composition onto an ink-jet ink receiver material, and subjecting the obtained image to radiation curing, wherein said radiation curable ink composition comprises at least one initiator and at least one polyhedral oligomeric silsesquioxane (POSS) represented by the following empirical formula $[R(SiO_{1.5})]_n$ wherein n=4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene groups wherein said radiation curable ink composition further comprises at least one photopolymerizable compound selected from the group consisting of vinylether methacrylates and vinylether acrylates.

19. Process according to claim 18, wherein said radiation curing is performed by means of at least one ultra-violet source and/or at least one electron beam source.

20. Process according to claim 18, wherein said curing is a free radical polymerization process.

21. Process according to claim 18, wherein said curing is a cationic polymerization process.

22. Process according to claim 18, wherein said ink-jet receiving material is selected from the group consisting of paper, coated paper, polyolefin coated paper, cardboard, wood, composite boards, plastic, coated plastic, canvas, textile, metal, glasses, plant fibre products, leather, magnetic materials and ceramics, or supports provided with an ink-accepting layer.

23. Process according to claim 22, wherein said ink accepting layer contains a microporous pigment or a polymer blend.

24. Process according to claim 18, wherein said polyhedral silsesquioxane comprises at least one R-group comprising a curable functional group.

25. Process according to claim 24, wherein said curable functional group is selected from the group consisting of epoxide, aziridine, acrylate, methacrylate, acrylamide, methacrylamide, olefinic and styryl groups.

26. Process according to claim 24, wherein said curable polyhedral oligomeric silsesquioxane (POSS) has a specific cage structure as represented by formulae I to III or partial cage structures as represented by formula IV:

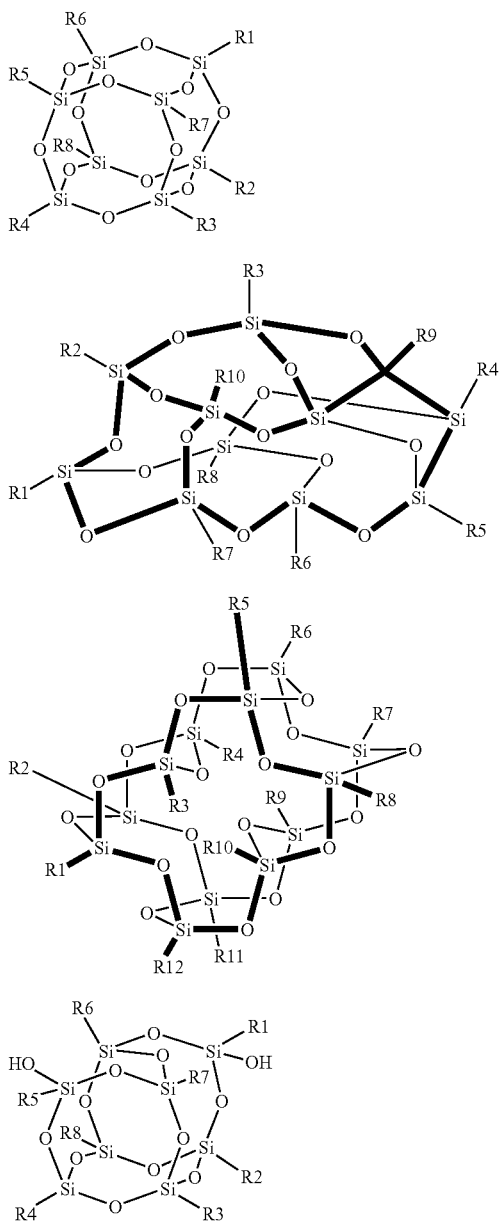

wherein R1 to R12 represents hydrogen, inorganic or organic substituents and at least one of R1-R12 groups comprises a curable functional group.

27. Process according to claim 18, wherein said initiator is a photoinitiator.

28. Process according to claim 18, wherein said radiation curable ink composition further contains an initiator synergist.

29. Process according to claim 18, wherein said radiation curable ink composition further contains at least one colorant.

30. Process according to claim 29, wherein said colorant is a dye.

31. Process according to claim 29, wherein said colorant is a pigment.

32. Process according to claim 31, wherein said pigment is selected from the group consisting of Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16, and carbon black.

33. Process according to claim 29, wherein said colorant is an inorganic pigment.

34. Process according to claim 29, wherein said colorant is a dispersed pigment or a solid solution of a pigment.

35. Process according to claim 18, wherein said vinylether methacrylate or vinylether acrylate is selected from the group consisting of:

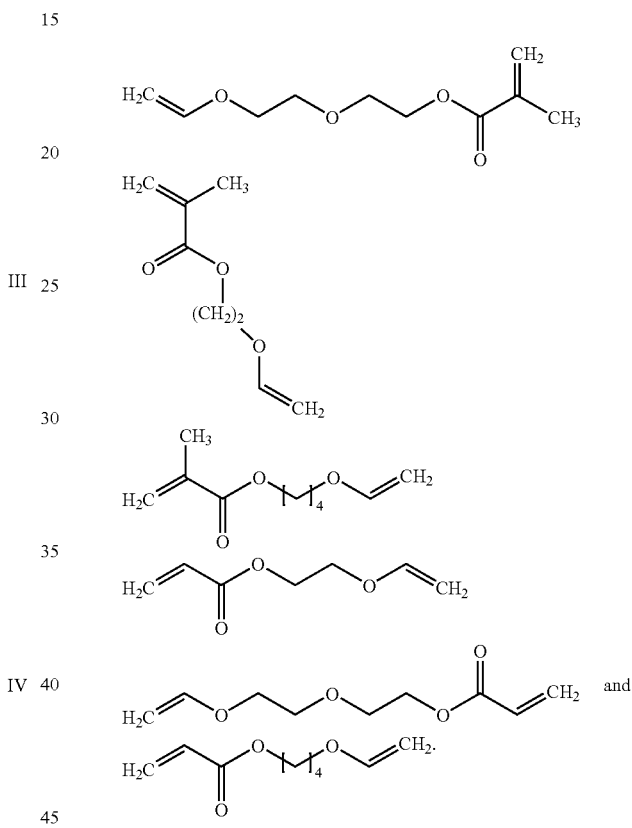

36. Process according to claim 18, wherein said radiation curable ink composition further contains a second photopolymerizable monomer, oligomer or prepolymer.

37. Process according to claim 36, wherein said second monomer is selected from the group consisting of amino modified polyether acrylates, urethane acryaltes, polyester acrylates, polyether acrylates, and epoxy acrylates.

38. Process according to claim 18, wherein said radiation curable ink composition further contains water and/or at least one organic solvent.

39. Process according to claim 18, wherein said radiation curable ink composition further comprises at least one conducting or semiconducting polymer.

40. Process according to claim 39, wherein said at least one conducting or semiconducting polymer is selected from the group consisting of substituted polyanilines, unsubstituted polyanilines, polyprroles, substituted polythiophenes, unsubstituted polythiophenes, substituted poly(phenylenevinylenes), unsubstituted poly(phenylenevinylenes), and polyfluorenes.

41. Process according to claim 18, wherein said radiation curable ink composition further comprises at least one antioxidant.

42. Process according to claim 18, wherein said radiation curable ink composition further comprises a dendrimer.

43. Process according to claim 18, wherein the viscosity of said radiation curable ink composition is between 1 and 100 mPa.s at 25° C.

44. Process according to claim 18, wherein said radiation curable ink composition is a radiation curable ink-jet ink composition.

45. A radiation curable ink composition comprising at least one initiator and at least one polyhedral oligomeric silsesquioxane (POSS) represented by the following empirical formula $[R(SiO_{1.5})]_n$ wherein n is 4, 6, 8, 10, 12, 14, 16 and larger and each R is independently hydrogen, an inorganic group, an alkyl group, an alkylene group, an aryl group, an arylene group, or non-heterocyclic group-containing organo-functional derivatives of alkyl, alkylene, aryl or arylene group, wherein said composition further comprises at least one photopolymerizable compound selected from the group consisting of vinylether methacrylates and vinylether acrylates.

* * * * *